(12) United States Patent
Andersen et al.

(10) Patent No.: US 9,165,291 B1
(45) Date of Patent: *Oct. 20, 2015

(54) PAYMENT TRANSACTION BY EMAIL

(71) Applicant: Square, Inc., San Francisco, CA (US)

(72) Inventors: Robert Andersen, Brooklyn, NY (US); Jochen Bekmann, San Francisco, CA (US); Brian Grassadonia, San Francisco, CA (US); Daniele Perito, San Francisco, CA (US); Peter Thomas Westen, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/246,023

(22) Filed: Apr. 4, 2014

Related U.S. Application Data

(60) Provisional application No. 61/891,342, filed on Oct. 15, 2013.

(51) Int. Cl.
  *G06Q 40/00* (2012.01)
  *G06Q 20/10* (2012.01)
  *G06Q 20/32* (2012.01)

(52) U.S. Cl.
  CPC .............. *G06Q 20/10* (2013.01); *G06Q 20/32* (2013.01); *G06Q 40/00* (2013.01)

(58) Field of Classification Search
  CPC .... G06F 21/35; G06Q 20/22; G06Q 20/4016; G06Q 10/107; G06Q 20/06; G06Q 20/14; G06Q 20/145; G06Q 20/38; G06Q 20/382; G06Q 20/4014; G06Q 30/04; G06Q 40/02
  See application file for complete search history.

(56) References Cited

U.S. PATENT DOCUMENTS 6,049,785 A 4/2000 Gifford
7,194,437 B1 3/2007 Britto et al.
(Continued)

FOREIGN PATENT DOCUMENTS

CA 2332656 A1 7/2002
CA 2 740 206 A1 2/2010
(Continued)

OTHER PUBLICATIONS

"Money Can't Buy Love But It Can Certainly Show It." PayPal. <http://.web.archive.org/web/20130827230842/https://www.paypal.com/us/webapps/mpp/send-money-online>, Aug. 27, 2013. (Retrieved May 28, 2014). (6 pages).*

(Continued)

*Primary Examiner* — Elda Milef
(74) *Attorney, Agent, or Firm* — Perkins Coie LLP

(57) ABSTRACT

Disclosed is a technology for seamless initiation of a financial service, such as a payment transaction, by sending a communication message. The disclosed technology can be used, for example, to send payment from a person (e.g., a consumer) to another over e-mail without requiring any sign-up or login procedure. In at least one embodiment, the technology includes receiving a service request email generated by a native email application on a consumer's device, verifying the email using information included in the email, and initiating the service as requested based on the information. Various embodiments of the disclosed technology enable a simplified payment transaction system for ordinary consumers without the hassle of having to sign up, to remember a user account and a password, and to login for sending or receiving every payment transaction, while not sacrificing the essential security feature of authenticating the user for every payment transaction.

16 Claims, 18 Drawing Sheets

(56) References Cited

U.S. PATENT DOCUMENTS

| | | | |
|---|---|---|---|
| 7,376,587 | B1 | 5/2008 | Neofytides et al. |
| 7,533,064 | B1 | 5/2009 | Boesch |
| 7,587,342 | B2 | 9/2009 | Neofytides et al. |
| 7,606,734 | B2 | 10/2009 | Baig et al. |
| 7,610,222 | B2 * | 10/2009 | Neofytides et al. ......... 705/26.42 |
| 7,778,890 | B1 * | 8/2010 | Bezos et al. ................. 705/26.1 |
| 8,255,983 | B2 * | 8/2012 | Schultz et al. ..................... 726/7 |
| 8,346,659 | B1 | 1/2013 | Mohsenzadeh |
| 8,447,693 | B2 | 5/2013 | Lynch et al. |
| 8,606,703 | B1 | 12/2013 | Dorsey et al. |
| 8,751,379 | B1 | 6/2014 | Bueche, Jr. |
| 8,762,272 | B1 * | 6/2014 | Cozens et al. .................. 705/40 |
| 8,893,296 | B2 * | 11/2014 | Dumais et al. .................. 726/27 |
| 2007/0255653 | A1 | 11/2007 | Tumminaro et al. |
| 2009/0132423 | A1 | 5/2009 | Liu |
| 2010/0306099 | A1 | 12/2010 | Hirson et al. |
| 2011/0055077 | A1 * | 3/2011 | French et al. ................... 705/39 |
| 2011/0137789 | A1 | 6/2011 | Kortina et al. |
| 2011/0208653 | A1 * | 8/2011 | Landesmann ................... 705/44 |
| 2011/0313921 | A1 | 12/2011 | Dheer et al. |
| 2011/0320343 | A1 | 12/2011 | Koh et al. |
| 2012/0054102 | A1 * | 3/2012 | Schwartz et al. ............... 705/44 |
| 2012/0209970 | A1 * | 8/2012 | Scipioni et al. ............... 709/223 |
| 2012/0246079 | A1 | 9/2012 | Wilson et al. |
| 2012/0310830 | A1 | 12/2012 | Paulsen et al. |
| 2012/0323978 | A1 | 12/2012 | Van Rooyen et al. |
| 2013/0060689 | A1 | 3/2013 | Oskolkov et al. |
| 2013/0325709 | A1 * | 12/2013 | Pollin et al. ..................... 705/40 |
| 2014/0129428 | A1 | 5/2014 | Tyler et al. |
| 2014/0279436 | A1 | 9/2014 | Dorsey et al. |
| 2014/0279444 | A1 * | 9/2014 | Kassemi et al. ............... 705/39 |
| 2014/0279446 | A1 | 9/2014 | Dorsey et al. |
| 2014/0279447 | A1 | 9/2014 | Dorsey et al. |

FOREIGN PATENT DOCUMENTS

| | | |
|---|---|---|
| JP | 2007-317173 A | 12/2007 |
| KR | 10-2009-0036165 A | 4/2009 |
| WO | 2011/081952 A1 | 7/2011 |

OTHER PUBLICATIONS

"Personal Finance," PayPal. <http://web.archive.org/web/20130828101500/http://www.windowsphone.com/en-us/store/app/paypal/75738196-1db2-49d9-afb1-d66a34d19fb6>, Aug. 28, 2013. (Retrieved May 29, 2014)(.*

Sapsford, Jathon. "You've Got Mail (With Cash!)—PayPal Sees Torrid Growth With a Service That Sents Money Across the Internet" Wall Street Journal. Feb. 16, 2000. (6 pages).*

"Beaming Money by Email is Web's Next Killer App". PR Newswire. Nov. 16, 1999:1. (6 pages).*

Murphy, Eamon. "Google Links Wallet to Gmail, Letting Users Attach Money to Emails." May 17, 2013. http://www.dailyfinance.com/on/google-wallet-gmail-email-money/. (3 pages).*

U.S. Appl. No. 14/246,017, of Grassadonia, B. et al., filed Apr. 4, 2014.

Non-Final Office Action mailed Jul. 2, 2014, U.S. Appl. No. 14/246,017, of Grassadonia, B. et al., filed Apr. 4, 2014.

Restriction Requirement mailed Sep. 8, 2014, U.S. Appl. No. 14/256,893, of Beckmann, J. et al., filed Apr. 18, 2014.

"Chirpify.com, Homepage," Retrieved from the Internet URL: https://www.chirpify.com/, on Mar. 25, 2013, pp. 1-13.

"Interac e-Transfer," Interac, Retrieved from the Internet URL: http://www.interac.ca/index.php/en/interac-etransfer/etransfer-detail, on Mar. 25, 2013, pp. 1-3.

"Money in the Bank, Fast," Venmo.com, Published May 30, 2011, Retrieved from the Internet URL: http://blog.venmo.com/hf2t3h4x98p5e13z82pl8j66ngcmry/money-in-the-bank-fast, on Jun. 25, 2014, pp. 1-2.

"New Apps for iPhone & Android," Venmo.com, Published Feb. 16, 2011, Retrieved from the Internet URL: http://blog.venmo.com/hf2t3h4x98p5e13z82pl8j66ngcmry/brand-new-venmo-apps-for-iphone-and-android, on Jun. 25, 2014, pp. 1-4.

Anonymous, "Ask Dr Dedupe—A . . . : NetApp Community," Published Sep. 8, 2009, Retrieved from the Internet URL: https://communities.netapp.com/community/netapp-blogs/drdedupe/blog/authors/parks?start=45, on Jul. 7, 2014, pp. 1-15.

Electronic Funds Corporation, "Introduction to ACH Processing—Processing Your Funds at the Speed of Light" Retrieved from the Internet URL: http://www.achnetwork.com/introtoach.html, on Mar. 25, 2013, p. 1-1.

El-Qorchi, M., "The Hawala System," Finance and Development, Dec. 2002, vol. 39, No. 4, Retrieved from the Internet URL: http://www.gdrc.org/icm/hawala.html, on Nov. 7, 2014, pp. 1-5.

Fowler, J., "8 Low-Cost Ways to Transfer Money," Published Apr. 21, 2011, Retrieved from the Internet URL: http://www.investopedia.com/financial-edge/0411/7-low-cost-ways-to-transfer-money.aspx, on Jul. 8, 2014, pp. 1-3.

Geffner, M., "Swipe! How Do Debit Cards Work?," Bankrate.com, Published Dec. 12, 2012, Retrieved from the Internet URL: http://www.bankrate.com/finance/banking/how-do-debit-cards-work.aspx, on Mar. 25, 2013, pp. 1-3.

Kim, R., "Chirpify Turns Twitter Into a Payment and Commerce Platform," Gigaom, Feb. 15, 2012, Retrieved from the Internet URL: http://gigaom.com/2012/02/15/chirpify-turns-twitter-into-a-payment-and-commerce-platform/, on Mar. 25, 2013, pp. 1-4.

Kitterman, A. S., "Sender Policy 1-14 Framework (SPF) Authentication Failure Reporting Using the Abuse Reporting Format, rfc. 6652.txt," Internet Engineering Task Force (IETF), Published by Internet Society (ISOC), Published Jun. 25, 2012, pp. 1-8.

Klensin, J., "RFC 5321—Simple Mail Transfer Protocol," Published Oct. 2008, Retrieved from the Internet URL: https://web.archive.org/web/20131012021519/http://tools.ietf.org/html/rfc5321, on Feb. 16, 2015, pp. 1-95.

Lomas, N., "Amex Launches Pay by Tweet, Turns Purchases Into Adverts," Tech Crunch, Published Feb. 12, 2013, Retrieved from the Internet URL: http://techcrunch.com/2013/02/12/amex-pay-by-tweet/, on Mar. 25, 2013, pp. 1-6.

Mossberg, W., "The Money Is in the Email," All things D, Published Oct. 15, 2013, Retrieved from the Internet URL: http://allthingsd.com/?p=365900&ak_action=printable, on Jul. 8, 2014, pp. 1-3.

O'Reilly Website, "Send Money to Anyone," Published date unknown,Retrieved from the Internet URL: https://web.archive.org/web/20041026014127/http://www.oreilly.com/pub/h/2144, on May 20, 2014, pp. 1-4.

Penrose, P., "Email Payment Challenges Banks," Dow Jones, Banking Technology, Mar. 1, 2000, pp. 1-2.

Schreiber, D., "'You've got Dwolla!'—Cash transfer startup rolls out email option," Silicon Prairie News, Published Jan. 11, 2011, Retrieved from the Internet URL: http://www.siliconprairienews.com/2011/01/you-ve-got-dwolla-cash-transfer-startup-rolls-out-email-option, on Jul. 8, 2014, pp. 1-5.

Stern, J., "Show Me the Money: The Best Apps to Pay Friends Back," Wall Street Journal, Published May 14, 2014, Retrieved from the Internet URL: http://online.wsj.com/news/articles/SB10001424052702304536104579558071421978060, on Jun. 25, 2014, pp. 1-4.

Warfel, D., "Customizing mailto: Links," The Great Escape Blog, Published Dec. 15, 2012, Retrieved from the Internet URL: http://blog.escapecreative.com/customizing-mailto-links/, pp. 1-5.

Non-Final Office Action mailed Jul. 8, 2013, for U.S. Appl. No. 13/839,623, of Dorsey, J. et al., filed Mar. 15, 2013.

U.S. Appl. No. 14/012,826, of Lee, et al., filed Aug. 23, 2013.

Notice of Allowance mailed Oct. 18, 2013, for U.S. Appl. No. 13/839,623, of Dorsey, J. et al., filed Mar. 15, 2013.

U.S. Appl. No. 14/260,194, of Dorsey, J. et al., filed Apr. 23, 2014.

Patent Examination Report No. 1 mailed on Apr. 7, 2014 in Australian Patent Application No. 2014201444, of Dorsey, J. et al., filed Mar. 13, 2014.

International Search Report and Written Opinion in International Patent Application No. PCT/US2014/022825, filed Mar. 10, 2014, received Jun. 24, 2014, 13 pages.

Notice of Acceptance mailed on Jul. 2, 2014 in Australian Patent Application No. 2014201444, of Dorsey, J. et al., filed Mar. 13, 2014.

(56) References Cited

OTHER PUBLICATIONS

Non-Final Office Action mailed Jul. 10, 2014, for U.S. Appl. No. 14/272,367, of Dorsey, J. et al., filed May 7, 2014.
European Search Report mailed Jul. 17, 2014 in European Patent Application No. 14 155 428.7, of Dorsey, J. et al., filed Feb. 17, 2014.
Office Action mailed on Aug. 8, 2014 in European Patent Application No. 14 155 428.7, of Dorsey, J. et al., filed Feb. 17, 2014.
Office Action mailed on Nov. 13, 2014 in Canadian Patent Application No. 2,845,817, of Dorsey, J. et al., filed Mar. 12, 2014.
Non-Final Office Action mailed Nov. 17, 2014, for U.S. Appl. No. 14/066,991, of Dorsey, J. et al., filed Oct. 30, 2013.
Final Office Action mailed Nov. 20, 2014, for U.S. Appl. No. 14/272,367, of Dorsey, J. et al., filed May 7, 2014.
Final Office Action mailed Dec. 8, 2014, for U.S. Appl. No. 14/246,017, of Grassadonia, B. et al., filed Apr. 4, 2014.
Non-Final Office Action mailed Mar. 11, 2015, for U.S. Appl. No. 14/256,893, of Beckmann, J. et al., filed Apr. 18, 2014.
Notice of Allowance mailed Mar. 25, 2015, for U.S. Appl. No. 14/246,017, of Grassadonia, B. et al., filed Apr. 4, 2014.

* cited by examiner

PAYMENT TRANSACTION BY EMAIL

CROSS-REFERENCE TO RELATED APPLICATIONS

This application claims priority to U.S. Provisional Application Ser. No. 61/891,342 filed Oct. 15, 2013, entitled "Email Payment Transaction," which is incorporated herein by reference in its entirety for all purposes.

BACKGROUND

Financial transactions are a crucial part of our everyday lives. On one end, there are financial transactions between merchants and consumers. On the other end, there are financial transactions between consumers. To service non-sophisticated consumers, payment from one party to another should remain simple and easy to execute. However, any solutions for consumer-to-consumer payments, especially over the Internet, must balance the need for security and authentication, as well as the need for simplicity of execution.

BRIEF DESCRIPTION OF THE DRAWINGS

Embodiments of the disclosed technology will be described and explained through the use of the accompanying drawings in which.

Figure 1:
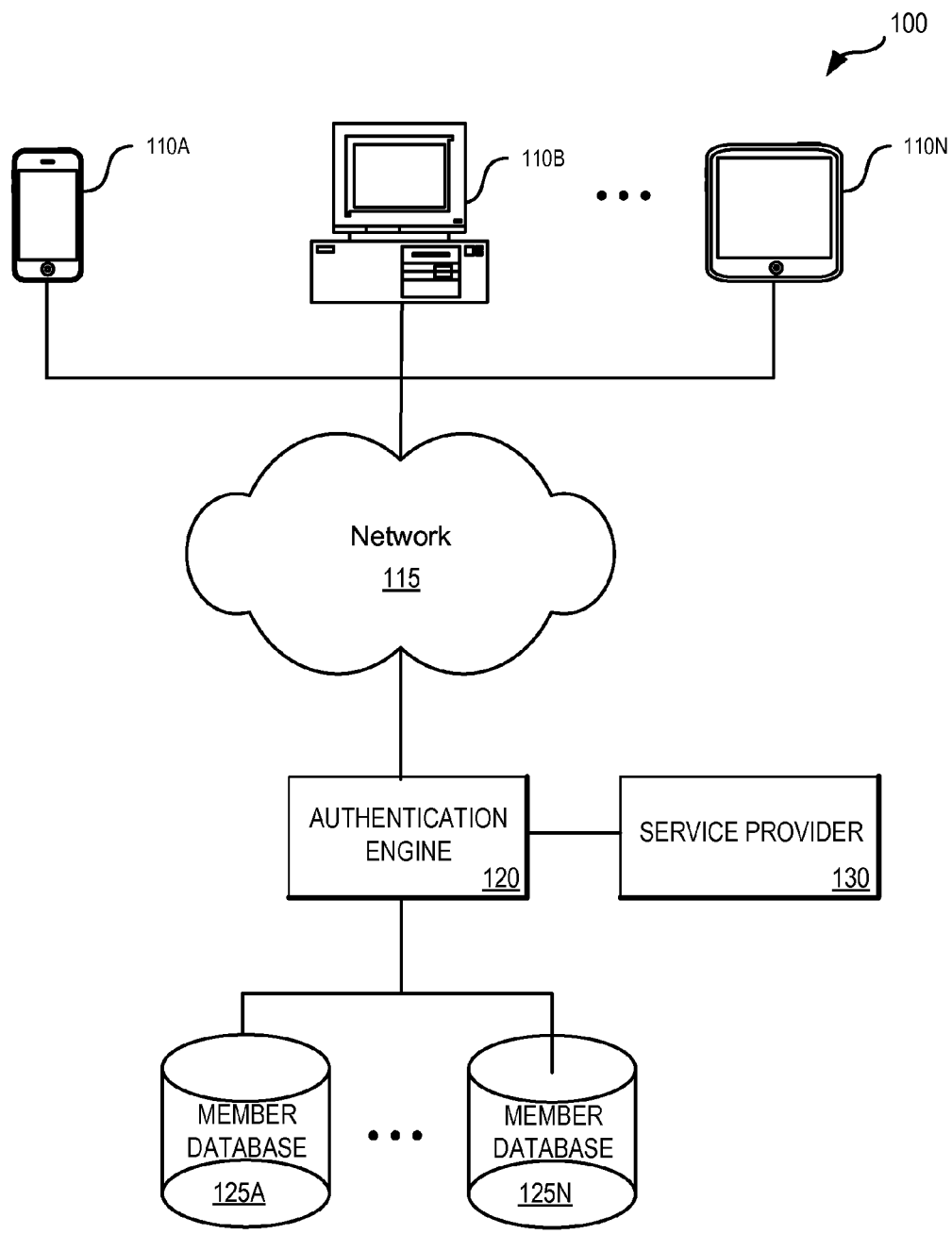
FIG. 1 illustrates an example of a networked-based environment in which some embodiments of the disclosed technology may be utilized.

The drawings have not necessarily been drawn to scale. For example, the dimensions of some of the elements in the figures may be expanded or reduced to help improve the understanding of the embodiments of the disclosed technology. Similarly, some components and/or operations may be separated into different blocks or combined into a single block for the purposes of discussion of some of the embodiments of the disclosed technology. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Introduced here is a technology for simplifying consumer-to-consumer transactions by use of an email mechanism. An example consumer-to-consumer transaction is a payment transaction to transfer money. Today, consumer-to-consumer transaction solutions typically require some form of registration by both of the consumers involved in the transaction (i.e., a sender and a recipient of the payment) before the payment transfer can occur. The registration generally includes an account creation process and a login verification process. In particular, a consumer must (a) enter various account information (e.g., name, address, email address, etc.) to create an account with a particular payment service, and (b) wait for a verification email in order to verify the customer's identity associated with the newly created account, for example, by clicking on a web address included in the verification email to enter various authentication credentials (e.g., login name, password, etc.). Some existing solutions also require verification of the banking institution(s) linked to the account (e.g., verify authentication amount deposited in the customer's bank account). In contrast, the technology introduced here provides efficient execution of financial transactions (e.g., payment transfers) by sending of an email message from a consumer's computing device to a payment service, without the need for any beforehand registration by the consumer (i.e., the sender) or the recipient.

In at least some embodiments, the technology utilizes an application that causes a native email application of the consumer's computing device to transmit an email message. The application further causes a token message to be transmitted from the computing device to the payment service, independent of the email message. The email message can include a payment amount to be transferred to a recipient, the recipient's name, a request for the payment service to transfer the payment amount to the recipient, and a message token. The token message can include the message token and an app token. The payment service can analyze the email message by comparing the message token in the email message in relation to the message token and the app token in the token message. In particular, the payment service, based on the email message, can identify the computing device of the consumer, verify that the email message has been sent from an email address of the consumer, and verify that the computing device is the only one capable of having produced the e-mail message. Having verified the email message (and the authenticity of the request to transfer money), the payment service initiates the process to transfer the payment amount. Hence, the technology provides not only convenience in the transfer of the payment, but also security in the transfer for both the consumer and the recipient.

Consider the following example of a user making a payment transfer, where the example is discussed for illustrative purpose only. In accordance with various embodiments, the user (i.e., sender), using a user computing device, starts an application to request a payment service to transfer money from a financial account of the user to a financial account of a second user (i.e., recipient). In particular, the user submits to the application a payment amount to be transferred, for example, using a keyboard of the computing device.

In response to the user's transfer request, the application generates a first unique token and a second unique token. The first unique token can be a randomly-generated number called an app token. The second unique token may be a message token that includes a specially constructed keyed-hash message authentication code (HMAC). One feature of an HMAC is that the HMAC is a one-way cryptographic hash of some agreed-upon data, random data, non-random data, and/or combination thereof. In some embodiments, the HMAC may include the app token. As a result, another party cannot reverse-compute the app token from a message token, but given the app token, can re-compute the same message token as a way of validation.

The application calls the native e-mail application on the computing device, and generates an e-mail that includes the second unique token (i.e., the message token). The application, having access to the user's e-mail via the native e-mail application, sends a secure message to the authentication engine. The secure message can contain the user's e-mail address and the second unique token. The e-mail can be sent to an e-mail address associated with the authentication engine.

After sending the e-mail, the computing device can then make a separate secure connection to the authentication engine and supplies both the message token and the app token (e.g., by transmitting a token message containing the message token and the app token). The authentication engine can verify that the email was sent by the user (i.e., from the computing device) by taking the message and app tokens included in the token message supplied via the secure connection, re-computing the message token from the app token, and comparing the recomputed message token to the message token included in the email received independently through a different channel (e.g., from the native email application). If the recomputed message token and the message token match, verification is successful. Such verification provides proof that the computing device making the secure connection is the same one that generated the email (using native email application executing on the device). By completing this verification, the authentication engine verifies that the computing device is the only one capable of having produced the e-mail that included the message token. Such verification constitutes a "login" to a service provider (e.g., a payment processing service, an online video content provider, etc.) without providing a username or password. Hence, the user, on the front end, is relieved of the burden of having to complete manually the process of account creation and login every time the user desires to make a payment transfer.

In some instances, the authentication engine can work in coordination with a spoof-checking mechanism to verify that the e-mail was sent from the user's e-mail address (i.e., the e-mail was not spoofed). A user's e-mail address is spoofed when an e-mail is sent from a different e-mail address, but is made to look like it was sent from the user's e-mail address. The spoof-checking mechanism can utilize a set of criteria to validate whether the email has been actually sent from a user-ID and a domain specified in the email address in order to determine if the email is authentic, spoofed, or uncertain. The spoof-checking mechanism can be, or a part of, the E-mail verification module 325 discussed below in reference to FIG. 3.

As discussed above, various embodiments of the disclosed technology enable a simplified payment transaction system for ordinary consumers without the hassle of having to sign up, to remember a user account associated with a password, and to login for sending or receiving every payment transaction, while not sacrificing the essential security feature of authenticating the user for every payment transaction. To send a payment, the user needs to only specify a receiver e-mail address in an e-mail. When the payment e-mail is created, the e-mail can be auto-populated with a security token. The e-mail can also carbon copy (Cc), blind carbon copy (Bcc), or add as a recipient (To) a payment processing e-mail address. When the e-mail is sent, a payment processing system can receive the payment e-mail (e.g., by receiving the payment e-mail through the payment processing e-mail address) and generate a payment receipt interface for the receiver of the e-mail. The payment processing system can asynchronously request financial account information by sending a request e-mail to the payment sender. Upon receiving the financial account information including a payment card number and authenticating the payment card, the sender e-mail address and the payment e-mail are automatically authenticated.

In other embodiments, the e-mail does not need to have a distinct recipient at all. For example, some embodiments compose e-mails that are addressed to: the authentication engine (e.g., authetnicate@company.com) as the only recipient. The payee's e-mail address could be included or identified in another manner. For example, in one embodiment, the payee's e-mail address could be included in the subject line alongside the dollar amount, e.g. "$10 to joe@domain.com". One advantage of this approach is that this technique would ensure that the payee does not receive two e-mails.

It is noted the technology introduced here can be used for any application that requires users to create and login to accounts. Further, while, for convenience, embodiments of the disclosed technology is described with reference to financial transaction service providers, embodiments of the disclosed technology are equally applicable to various other service providers (e.g., social networks) or any application that requires a user to be validated to access their individual account.

Moreover, the technology introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to cause one or more processors to perform the methods, variations of the methods, and other operations described here. The machine-readable medium may include, but is not limited to, floppy diskettes, optical discs, compact disc read-only memories (CD-ROMs), magneto-optical discs, read-only memories (ROMs), random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions.

TERMINOLOGY

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the disclosed technology, and may be included in more than one implementation. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "module" or "engine" refers broadly to general or specific-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more modules and/or engines, or a module and/or engine can include one or more application programs.

GENERAL DESCRIPTION

FIG. 1 illustrates an example of a network-based environment in which some embodiments of the disclosed technology may be utilized. The embodiments illustrated in FIG. 1 show computing devices 110A-110N that can be any computing device capable of receiving user input as well as transmitting and/or receiving data via the network 115. In one embodiment, computing device 110A-110N may be a conventional computer system (e.g., a desktop or laptop computer) or a mobile device having computer functionality (e.g., a tablet device, a mobile telephone, or a smart-phone). Computing devices 110A-110N may be configured to communicate via the network 115 with authentication engine 120 and service provider 130. In some embodiments, computing devices 110A-110N can retrieve or submit information to authentication engine 120 and run one or more applications with customized content retrieved from authentication engine 120 or service provider 130. For example, computing devices 110A-110N can execute a browser application or a customized client to enable interaction between the computing devices 110A-110N and authentication engine 120 or service provider 130.

Network 115 can include any combination of local area and/or wide area networks, using both wired and wireless communication systems. In one embodiment, network 115 uses standard communications technologies and/or protocols. Thus, network 115 may include links using technologies such as Ethernet, 802.11, worldwide interoperability for microwave access (WiMAX), 3G, 4G, CDMA, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

Authentication engine 120 can be executing, or running, on one or more servers and used to authenticate users and/or manage access to service provider 130. Authentication and access control may be based on information received through various user interfaces running on computing devices 110A-110N or other interactions, communications, and/or other inputs (e.g., e-mails, tokens, and/or communications via other channels). Authentication engine 120 can be calibrated/configured by individual companies or service providers, based on risk tolerance and/or other business objectives, to authenticate users. In some cases, access to the individual companies or service providers based may be on different criteria. For example, in addition to rendering an authentication decision, authentication engine 120 may be configured to compute a risk profile or score. That profile may be used by itself to make a decision, or it may be used in conjunction with other profiles, scores, and/or business practices. Authentication engine 120 may also be configured to recommend an access level the user should be granted. In some embodiments, authentication engine 120 includes various data processing and analytic tools that allow for implementation, creation, and evaluation of users and user information retrieved from member databases 125A-125N.

Service provider 130 may be a payment processing system in some embodiments. A sender can use a payment sender device to send a payment to a payment receiver device using a payment processing system. Payment sender device and payment receiver device can be computing devices 110A-110N. As described above, the payment sender device and payment receiver device can be an electronic device with computer functionalities, such as a mobile phone, a desktop computer, a laptop computer, a computer server, a cloud computing environment, a virtualized computing environment, a computer cluster, an application specific integrated circuit, a field programmable gate array, or any combination thereof. The payment processing system can be a computer server, a computer system, a cloud computing environment, a virtualized computing environment, a computer cluster, or any combination thereof. The payment processing system can be computer system 800 described in FIG. 8.

In accordance with various embodiments, a payment transaction can be initiated on the payment sender device. For example, the payment sender device can be a mobile device and the payment transaction can be initiated by a mobile application. The user can click a button on the mobile application and a native e-mail application of the payment sender device can be brought up to draft a payment transaction e-mail. As used here, the term "native e-mail application" refers generally to an application for sending and receiving digital messages, or electronic mail (i.e., "email" or "e-mail"), where the application has been developed for use on a particular platform or device. The native email application can be, for example, the default email application utilized by a computing device's operating system, working in coordination with the processor, to send and/or receive email. In embodiments, the carbon copy ("Cc") field of the native e-mail application (e.g., Gmail™, Outlook™, or Hotmail™) can be automatically filled in with a processing system e-mail address, such as "pay@domain.com." The user can specify a recipient e-mail address in the "TO:" field of the native e-mail application. Alternatively, the recipient e-mail address can be specified in the mobile application that initiates the payment transaction.

The user can enter an amount of payment on either the mobile application or in the "SUBJECT" field of the native e-mail application. The user can also include a message in the body of the e-mail being drafted on the native e-mail application. A security token can be embedded in the e-mail being drafted. The security token can be encrypted. The security token can include information regarding sender e-mail address, device characteristic(s) and/or identifier of the payment sender device, financial account information of the sender user (e.g., debit card account information or credit card account information), or any combination thereof.

Even without the financial account information of the sender user, the e-mail can still be sent from the native e-mail application. However, if the sender user so chooses, the financial account information can be entered on the mobile application and encoded within the security token that is prepopulated and embedded in the e-mail being drafted.

Before the e-mail being drafted (i.e., the payment transaction e-mail) is sent, neither the mobile application nor the native e-mail application requires the sender user to login to a payment system (i.e., not even the payment processing system). When the e-mail is sent, the payment processing system can receive the payment transaction e-mail. For example, the payment processing system can generate an interactive payment receiving interface to include into the body of the payment transaction e-mail.

If no financial account information is embedded in the e-mail, the payment processing system can send a financial account request e-mail to the sender e-mail address requesting that financial account information be entered. The financial account request e-mail can include a secure link to enter the financial account information, such as a debit card number or a credit card number and associated authentication information (e.g., expire date, ZIP Code, PIN number, or security code).

When the payment transaction e-mail is accompanied by the financial account information (either initially embedded in the security token or later entered through the financial account request e-mail), the payment transaction e-mail can be delivered to the recipient e-mail address. The payment transaction e-mail can include the interactive payment receiving interface. The recipient user can choose to accept or reject the payment transaction. In order to receive the payment, the recipient user is not required to sign up to any payment system nor required to login to any payment system (i.e., no need to remember a username and a password).

To receive the payment, the recipient user has to be associated with a financial account. For example, the recipient user can simply input financial account information, such as a debit card number or a credit card number. If the recipient e-mail address has previously received payment and entered financial account information through an interactive payment receiving interface of the payment processing system, then the financial account information can still be associated with the recipient e-mail address. Associations of financial accounts with the recipient e-mail address can be stored on the payment processing system similar to the sender e-mail address. Information of the financial accounts can be used for future authentication of payment e-mails.

Figure 2:
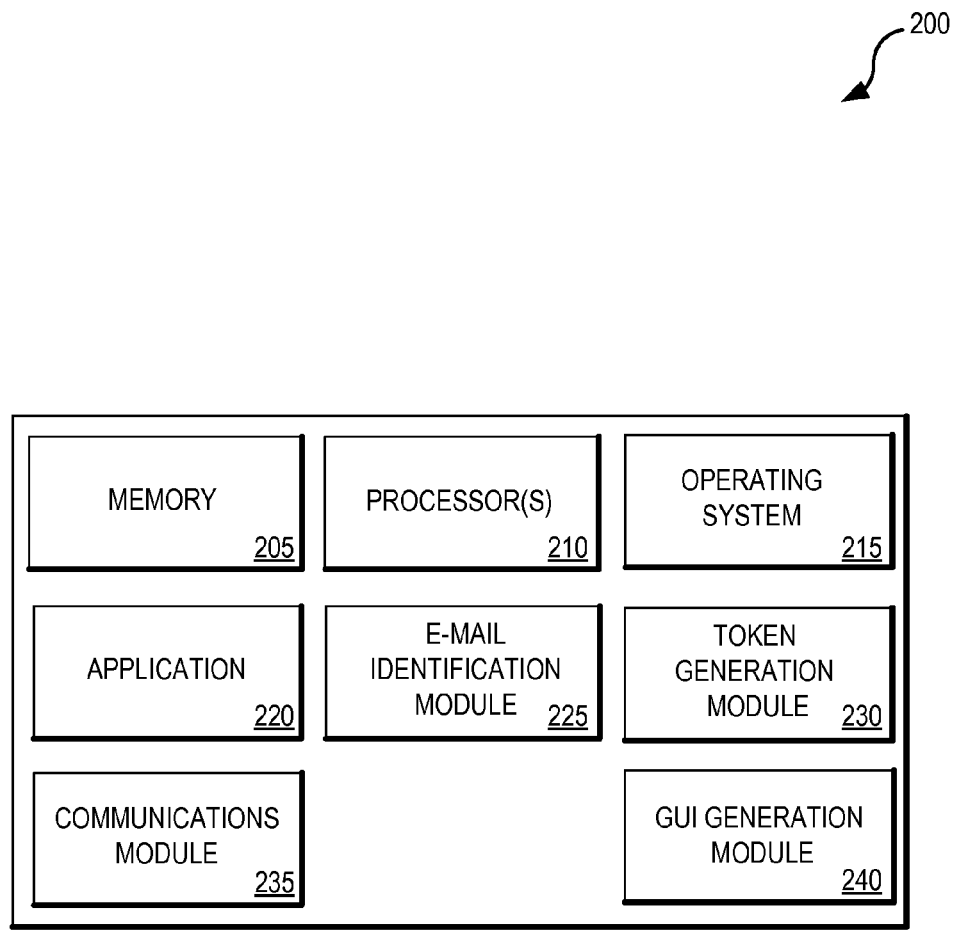
FIG. 2 illustrates various components of a computing device that may be used in accordance with one or more embodiments of the disclosed technology.

FIG. 2 illustrates a set of components within computing device 110 according to one or more embodiments of the disclosed technology. According to the embodiments shown in FIG. 2, computing device 110 can include memory 205, one or more processors 210, operating system 215, application 220, e-mail identification module 225, token generation module 230, communications module 235, and graphical user interface (GUI) generation module 240. Other embodiments of the disclosed technology may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, application 220, e-mail identification module 225, and token generation module 230 can be combined into a single component.

Memory 205 can be any device, mechanism, or populated data structure used for storing information. In accordance with some embodiments of the disclosed technology, memory 205 can encompass any type of, but is not limited to, volatile memory, nonvolatile memory and dynamic memory. For example, memory 205 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running, or executing, one or more applications or modules on processor(s) 210. For example, memory 205 could be used in one or more embodiments to house all or some of the instructions needed to execute the functionality of operating system 215, application 220, e-mail identification module 225, token generation module 230, communications module 235, and graphical user interface (GUI) generation module 240.

Operating system 215 can provide a software package that is capable of managing the hardware resources of computing device 110. Operating system 215 can also provide common services for software applications running, or executing, on processor(s) 210. In accordance with various embodiments, operating system 215 can coordinate resources for multiple applications 220 that allow a user to access and interact with service providers. For example, applications 200 can include a money transfer application, a social networking application, a banking application, a gaming application, and the like. Applications 220 can access a server associated with the service provider to retrieve account details. However, before allowing access, a user of application 220 needs to be authenticated. Traditionally, the authentication process has been cumbersome, requiring a username and password be entered by the user.

In contrast, various embodiments provide for a passwordless authentication scheme that uses a native (or default) e-mail application executing, or running, on the computing device to send an e-mail. Once a user launches application 220, e-mail identification module 225 determines the native e-mail application running on computing device 110. E-mail identification module 225 can automatically create an e-mail message by automatically populating the header fields (i.e., To, CC, Subject, etc.) and the body of the message. If multiple e-mail applications are available on the computing device, e-mail identification module 225 may request the user to select the desired e-mail account for the transaction (see, e.g., FIG. 7E).

In some embodiments, token generation module 230 can be used to generate a unique token that can be included in the body. Token generation module 230 can generate a token based on a variety of information such as, but not limited to, mobile device ID, IP address, application ID, application activity (e.g., send $20, access account, etc.), e-mail address used by the native e-mail application, a destination e-mail address identified by the user within the application, device characteristics (e.g., memory, processors, etc.), and/or other information. In accordance with various embodiments, the message may be sent to the destination without any visual acknowledgements to the user. In other embodiments, the message may be populated and visually displayed on a screen. The token may be embedded and/or hidden within the body to that the user cannot easily identify the token. Communications module 235 can send the e-mail to authentication engine 120.

GUI generation module 240 can generate one or more GUI screens that allow for interaction with a user of the computing device. In at least one embodiment, GUI generation module 240 generates a graphical user interface allowing a user of the mobile device to set preferences, prioritize applications, select application functionality, set device constraints, customize messages, and/or otherwise receive or convey information to the user. FIGS. 7A-7K illustrate various examples of graphical user interfaces that can be generated by GUI generation module 240.

Figure 3:
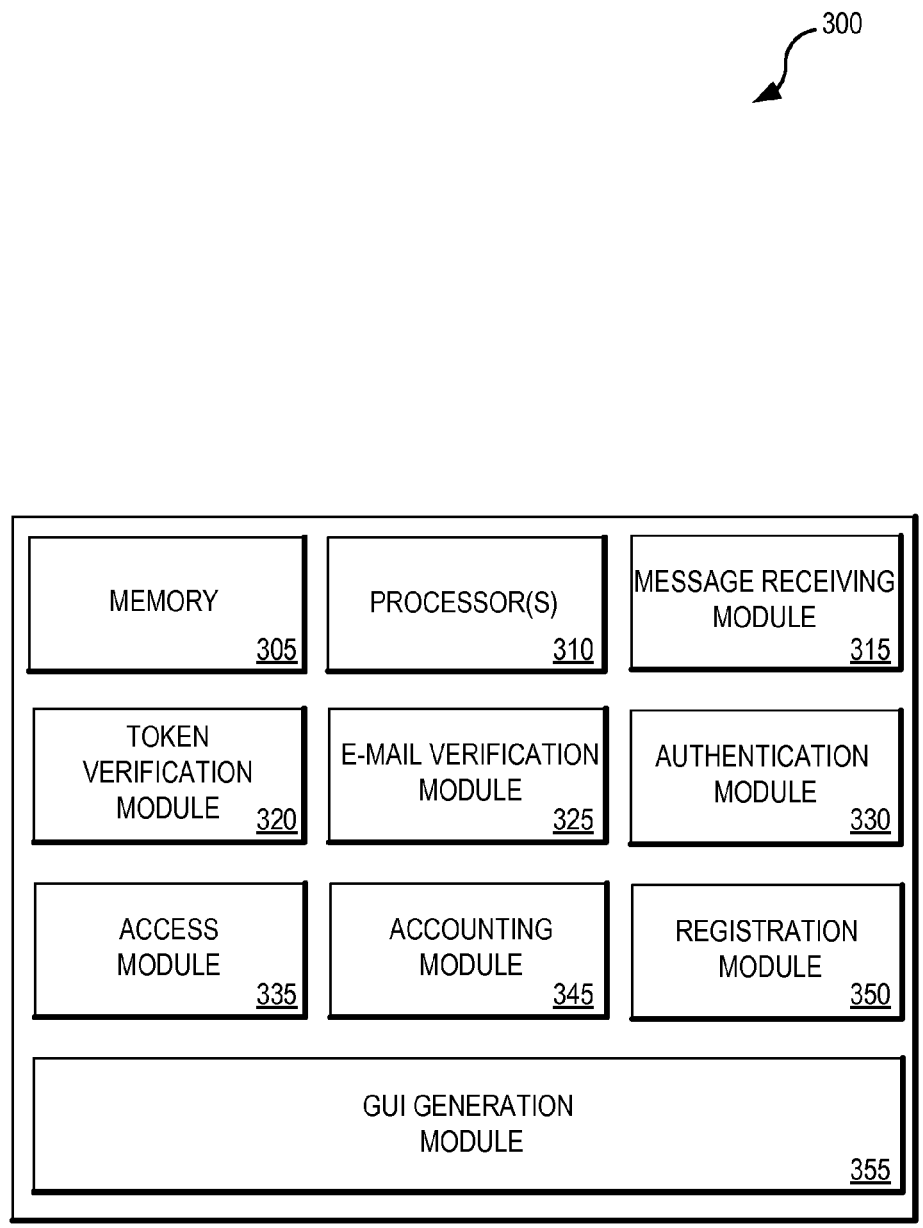
FIG. 3 illustrates various components of an authentication engine that may be used in accordance with various embodiments of the disclosed technology.

FIG. 3 illustrates a set of components within authentication engine 120 according to one or more embodiments of the disclosed technology. According to the embodiments shown in FIG. 3, authentication engine 120 can include memory 305, one or more processors 310, message receiving module 315, token verification module 320, e-mail verification module 325, authentication module 330, access module 335, accounting module 345, registration module 350, and graphical user interface (GUI) generation module 355. Other embodiments of the disclosed technology may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, token verification module 320, e-mail verification module 325, and authentication module 330 can be combined into a single module for authenticating the user.

Memory 305 can be any device, mechanism, or populated data structure used for storing information as described above for memory 205. Memory 305 may be used to store instructions for executing, or running, one or more applications or modules on processor(s) 310. For example, memory 305 could be used in one or more embodiments to house all or some of the instructions needed to execute the functionality of message receiving module 315, token verification module 320, e-mail verification module 325, authentication module 330, access module 335, accounting module 345, registration module 350, and graphical user interface (GUI) generation module 355.

Message receiving module 315 can receive e-mail messages and identify any tokens embedded within the message. In some embodiments, message receiving module 315 receives the token via other electronic communication mediums (i.e., channels). For example, the electronic communication containing the token can be sent via text message, e-mail, internet relay chat (IRC), file transfer protocol (FTP), hypertext transfer protocol (http), hypertext transfer protocol secure (https), or transmission control protocol/internet protocol (TCP/IP), among others. The electronic communication can contain a unique address identifying to where the communication is to be sent. Examples of the unique address include a phone number, an e-mail address, an internet protocol (IP) address, a uniform resource locator (URL), a host address, and a channel address.

Token verification module 320 validates the token. In some embodiments, for example, token verification module 320 compares the token against a second token sent through an alternate channel. Token verification module 320 can verify several tokens. For example, validation of a token received embedded in an e-mail can verify that the user sent the e-mail, or that the e-mail was sent by the payment facilitation application, the electronic device, and/or the payment facilitation application while running on the electronic device. In such example, the token embedded in the email can be compared against a second token sent through, for example, the payment facilitation application (i.e., alternative channel), to perform the verification.

E-mail verification module 325 can be used to determine if the e-mail messages are from forged sender addresses (i.e., spoofed e-mails). E-mail verification module 325 may combine a variety of known and proprietary techniques for determining the authenticity of the sender. In one example, E-mail verification module 325 verifies that an e-mail is authentically from a user's e-mail address. The user's e-mail address is USERID@DOMAIN.com. E-mail verification module 325 verifies that the e-mail is from the domain (i.e. DOMAIN-.com), and that the e-mail is from USERID, the USERID verified to be at DOMAIN.com. In some embodiments, when e-mail verification module 325 is not able to verify that the e-mail is authentic, the e-mail verification module sends an e-mail to the user's e-mail address to verify the authenticity of the received e-mail. The user indicates the authenticity of the e-mail previously received by e-mail verification module 325 by, for example, clicking on a hyperlink in the e-mail sent to the user. E-mail verification module 325 receives notification that the user's clicking on the hyperlink, and authenticates the previously received e-mail.

Authentication module 330 can use the information from token verification module 320 and e-mail verification module 325 along with other information in making an authentication decision. The decision generated by authentication module 330 is used by access module 335 in granting or denying access to a user account held at the service provider. In some embodiments, the decision generated by authentication module 330 is used in granting or denying access to a restricted command. Examples of restricted commands include a command to log a person in to an account, a command to cause a transfer of funds from one account to a second account, and a command accessing restricted data, among others. Examples of accounts that a login command may log a user in to include a social media account, an account at a financial institution, an account at a bank, an account at a credit union, an account at a merchant, an account at a service provider, or an account at a rental provider, among others.

Accounting module 345 may be used to track financial transactions. For example, in some embodiments, service provider 130 (FIG. 1) may charge for access. In other embodiments, accounting module 345 can ensure that payments from a sender to a receiver are properly deducted and credited.

Registration module 350 can be used to register a user with the service provider if the e-mail address has not been previously registered. Graphical user interface (GUI) generation module 355 is similar to GUI generation module 240. GUI generation module 355 can generate one or more GUI screens that allow for interaction with a user of the authentication engine. In at least one embodiment, GUI generation module 355 generates a graphical user interface allowing a user of the mobile device to set preferences, authentication standards, set rules, set constraints, customize messages, and/or otherwise receive or convey information to the user.

Figure 4:
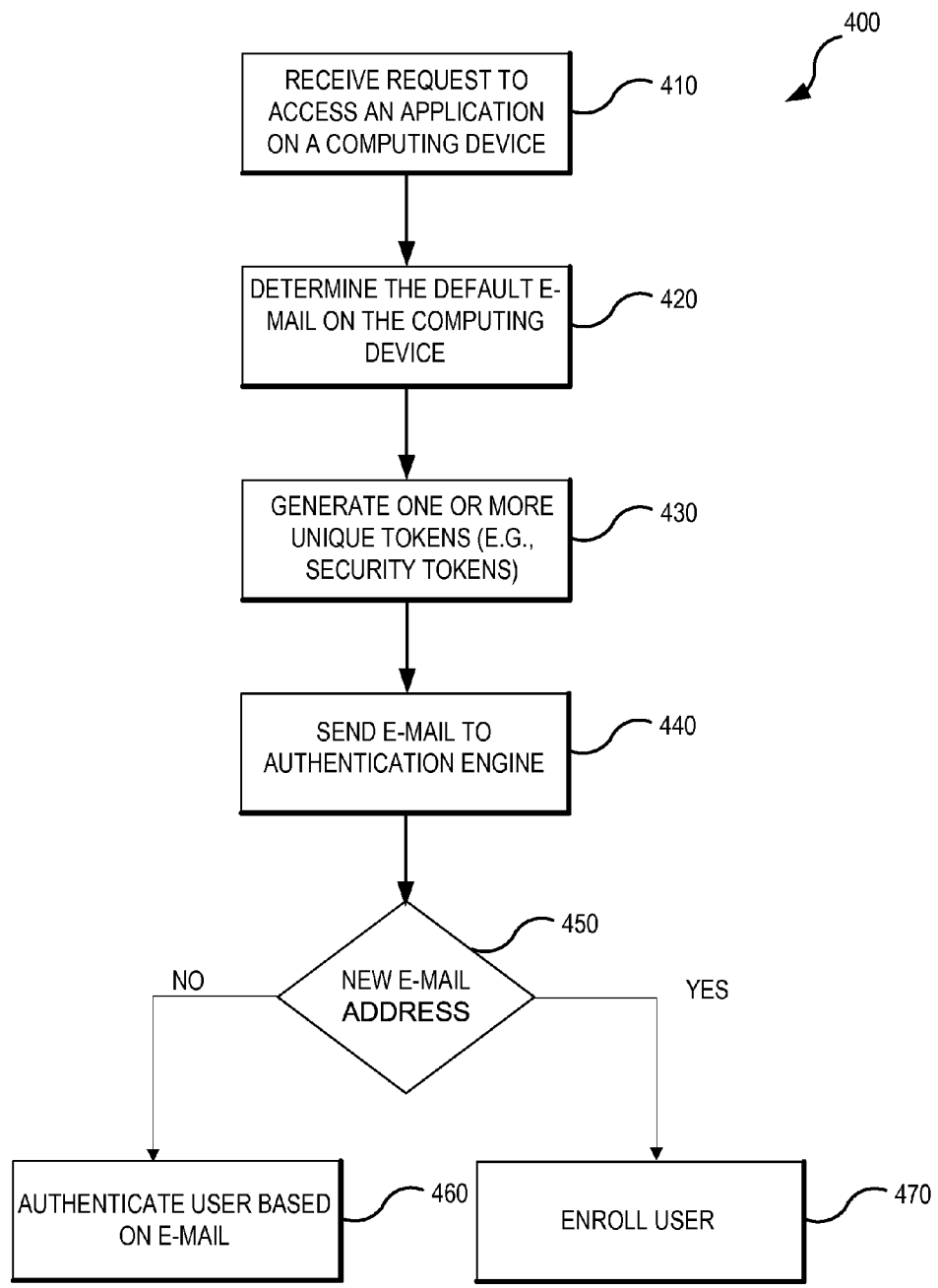
FIG. 4 is a flowchart illustrating a set of operations for authenticating or enrolling a user in accordance with some embodiments of the disclosed technology.

FIG. 4 is a flowchart illustrating a set of operations 400 for authenticating or enrolling a user in accordance with some embodiments of the disclosed technology. The operations illustrated in FIG. 4 may be performed by one or more components, devices, or modules such as, but not limited to, computing devices 110A-110N, authentication engine 120, processor 210, e-mail identification module 225, communications module 235, e-mail verification module 325, registration module 350, or other component or device. As illustrated in FIG. 4, receiving operation 410 receives a request to access an application. In some embodiments, access to the application may require user authentication before allowing access. In other cases, the application may launch and authenticate the user upon receiving a transaction request (e.g., transfer $20 to a recipient, access an account, etc.)

Determination operation 420 determines the native e-mail application running, or executing, on a computing device. This operation can ensure that the user has properly logged into the account and is able to send an e-mail from the computing device. Generation operation 430 generates one or more unique identifiers or tokens. The identifier or token can be based on device characteristics, transaction characteristics, positional information (e.g., from a GPS), and/or other information. The identifier or token can be embedded within the e-mail message and sent to the authentication engine during transmission operation 440.

Once the e-mail has received, determination operation 450 determines if the e-mail address is registered with the service provider. If determination operation 450 determines that the e-mail address has previously been registered, then determination operation 450 branches to authentication operation 460 where the e-mail address is authenticated. If determination operation 450 determines that the e-mail address has not previously been registered, then determination operation 450 branches to registration operation 470 where the user is enrolled with the service provider. In some embodiments, if a user subsequently accesses the application after the user has enrolled (e.g., by going through the flow in FIG. 4), then no e-mail is generated and the application can use the information acquired from the previous enrollment to determine if the user has access.

Figure 5:
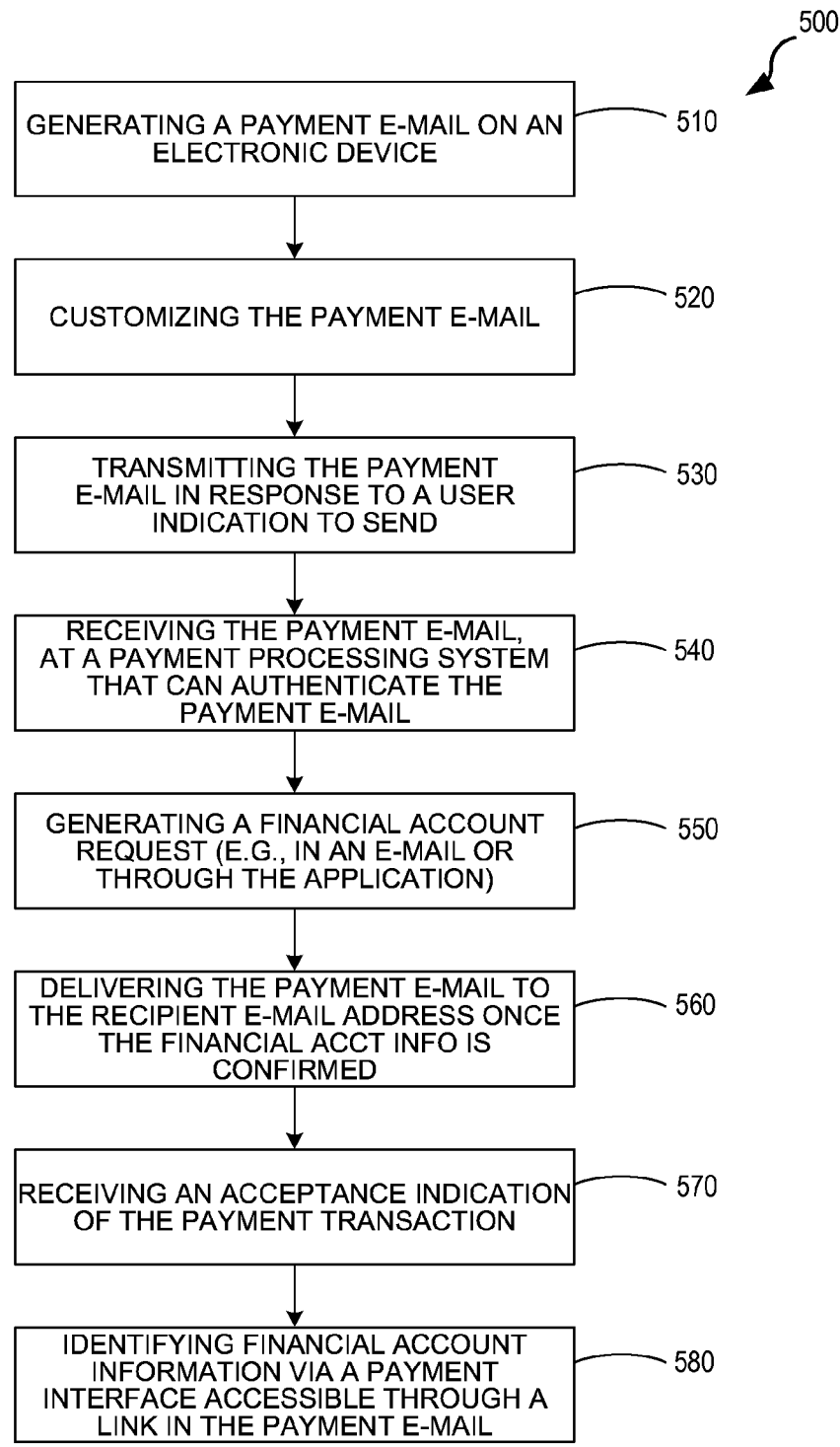
FIG. 5 is a flowchart illustrating a set of operations for sending a cash payment over e-mail in accordance with various embodiments of the disclosed technology.

FIG. 5 is a flowchart illustrating a set of operations 500 for sending a cash payment over e-mail in accordance with various embodiments of the disclosed technology. E-mail operation 510 generates a payment e-mail with one or more pre-populated fields and an embedded security token on an electronic device. The pre-populated fields can include a copy in the header (e.g., Cc, Bcc, or additional recipient in To fields) indicating an e-mail address associated with a payment processing system. If the sender user has previously indicated a payment amount, the pre-populated fields can also include a subject line including the payment amount (e.g., dollar amount or other currency amount). E-mail operation 510 can be performed by the electronic device operated by a sender user, such as the computing device 110A-110N of FIG. 1. Specifically, e-mail operation 510 can be performed by a payment facilitation application on the electronic device.

The embedded security token can be a cryptographic hash function such as a keyed-hash message authentication code (HMAC). The cryptographic hash function may be a one-way cryptographic hash of some agreed-upon data. In some embodiments, the cryptographic hash function may include or be based on an app token as part of the agreed-upon data. By keying the cryptographic hash function with the app token an extra layer of verification can be provided in some embodiments. As a result, another party cannot reverse-compute the app token from a message token, but given the app token, can re-compute the same message token as a way of validation.

In some embodiments, the security token can include or be based on cryptographically secured message based on a sender e-mail address, a device identification of the electronic device, financial account information of the sender user, or any combination thereof. In some embodiments, the security token can be based on a random number and a timestamp. If the sender user has multiple e-mail accounts, the sender user can select which of the e-mail accounts to use. The selected e-mail account can then be used to generate the embedded security token. The sender user can identify financial account information, such as debit card or credit card information, on the payment facilitation application. The financial account information can then be used to generate the embedded security token. However, in some embodiments, the financial account information is not included in the embedded security token. For example, the financial account information can be requested later. For another example, the financial account information can already be associated with the sender e-mail address on a previous transaction, and thus does not need to be re-entered.

Customization operation 520 allows the user to customize the payment e-mail. For example, the electronic device operated by the sender user can receive a customization of the payment e-mail, such as an indication of a recipient e-mail address and a short message in the body of the payment e-mail for the recipient. The customization of the payment e-mail can be received through an e-mail application of the electronic device operated by the sender user. The e-mail application can be a native application to send or receive e-mails. Portions or all of the customization of the payment e-mail can also be received through a separate application, such as the payment facilitation application, on the electronic device that launches the e-mail application prior to sending the payment e-mail. The payment e-mail can be sent in accordance with any standard e-mail format, including any digital media objects that can be embedded or attached under a conventional e-mail format.

The electronic device can transmit the payment e-mail in response to a user indication to send in transmission operation 530. The user indication, for example, can be a click of a button on an e-mail application of the electronic device. A payment processing system, such as the payment processing system, can receive the payment e-mail prior to transmitting the payment e-mail to the recipient e-mail address to authenticate the payment e-mail during receiving operation 540. In various embodiments, the receipt of the payment e-mail is enabled by the payment e-mail sending (e.g., carbon copying) the e-mail to an e-mail address associated with the payment processing system.

The payment processing system can determine whether there are multiple financial accounts associated with the sender e-mail address. If and when the payment processing system determines there is financial account information associated with the sender e-mail address, the payment processing system can determine which financial account is to be used to fund the payment transaction. For example, which financial account to use may be indicated in the embedded security token of the payment e-mail. Receiving operation 540 can include generating a payment receiving interface and including the payment receiving interface in the payment e-mail. Alternatively, the payment receiving interface can be pre-populated during e-mail operation 510 by the payment facilitation application. In some embodiments, the use of e-mail is hidden from the user. For example, the payment facilitation application can generate, customize, and/or send the e-mail based on input that the user provides to the payment facilitation application. The user could be unaware that e-mail is being used, as the payment facilitation application and not the user interacts with the e-mail system.

When the payment processing system determines that no financial account information is associated with the sender e-mail address, the payment processing system can send a financial account request (e.g., in an e-mail directed to the sender e-mail address or directly through the application) to request financial account information from the sender user using sending operation 550. The financial account request can include an interactive interface to enter financial account information.

Once the payment processing system confirms that there is financial account information associated with the sender e-mail address, the payment e-mail can be delivered to the recipient e-mail address during delivery operation 560. The recipient user can then indicate an acceptance of the payment transaction through the payment receiving interface during acceptance operation 570. Alternatively the recipient user can indicate a rejection of the payment transaction.

In order to receive the payment amount of the payment transaction, recipient financial account information has to be associated with the recipient e-mail address. For example, the association of the recipient financial account information can be found on the payment processing system. Alternatively, if there is no record of a prior transaction including the recipient financial account information, the recipient user can identify the recipient financial account information via the payment receiving interface accessible through a link in the payment e-mail during identification operation 580.

Figure 6:
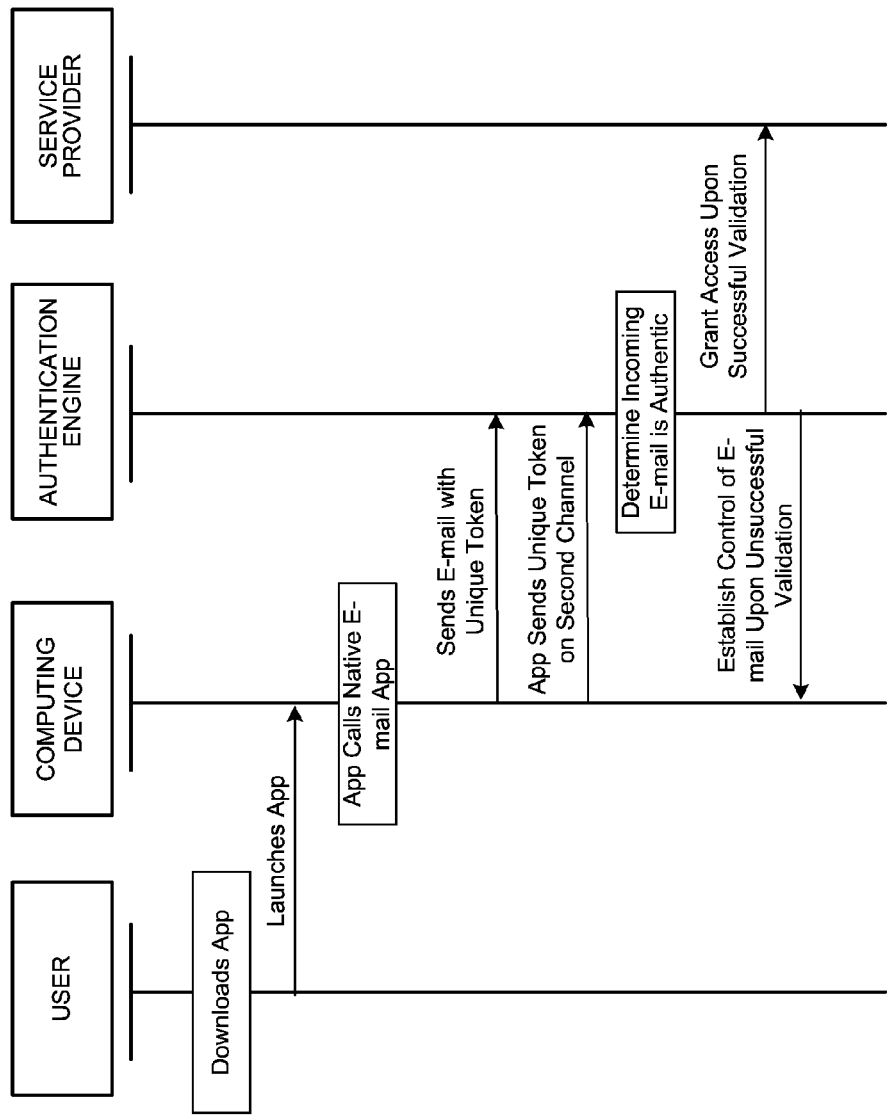
FIG. 6 is a sequence diagram illustrating various interactions between components of a networked-based system in accordance with some embodiments of the disclosed technology.

FIG. 6 is a sequence diagram illustrating various interactions between components of a networked-based system in accordance with some embodiments of the disclosed technology. As illustrated in FIG. 6, a user can download an application on their computing device. The user launches the application. The application calls the native e-mail application and sends (e.g., automatically or upon confirmation by the user) an e-mail message with a unique identifier or token to the authentication engine. In some embodiments, the application may generate a unique application token (e.g., 160 bit apptoken) which can be used to generate the unique identifier or payment token. In addition, the application sends the unique identifier or payment token along with the application token to the authentication engine via another channel. The authentication engine determines if the incoming e-mail is authentic. If the authentication engine can determine the incoming e-mail is authentic, access to the service provider is granted to the application. If the incoming e-mail is not successfully validated, control of the e-mail account can be established through other techniques.

Figure 7A:
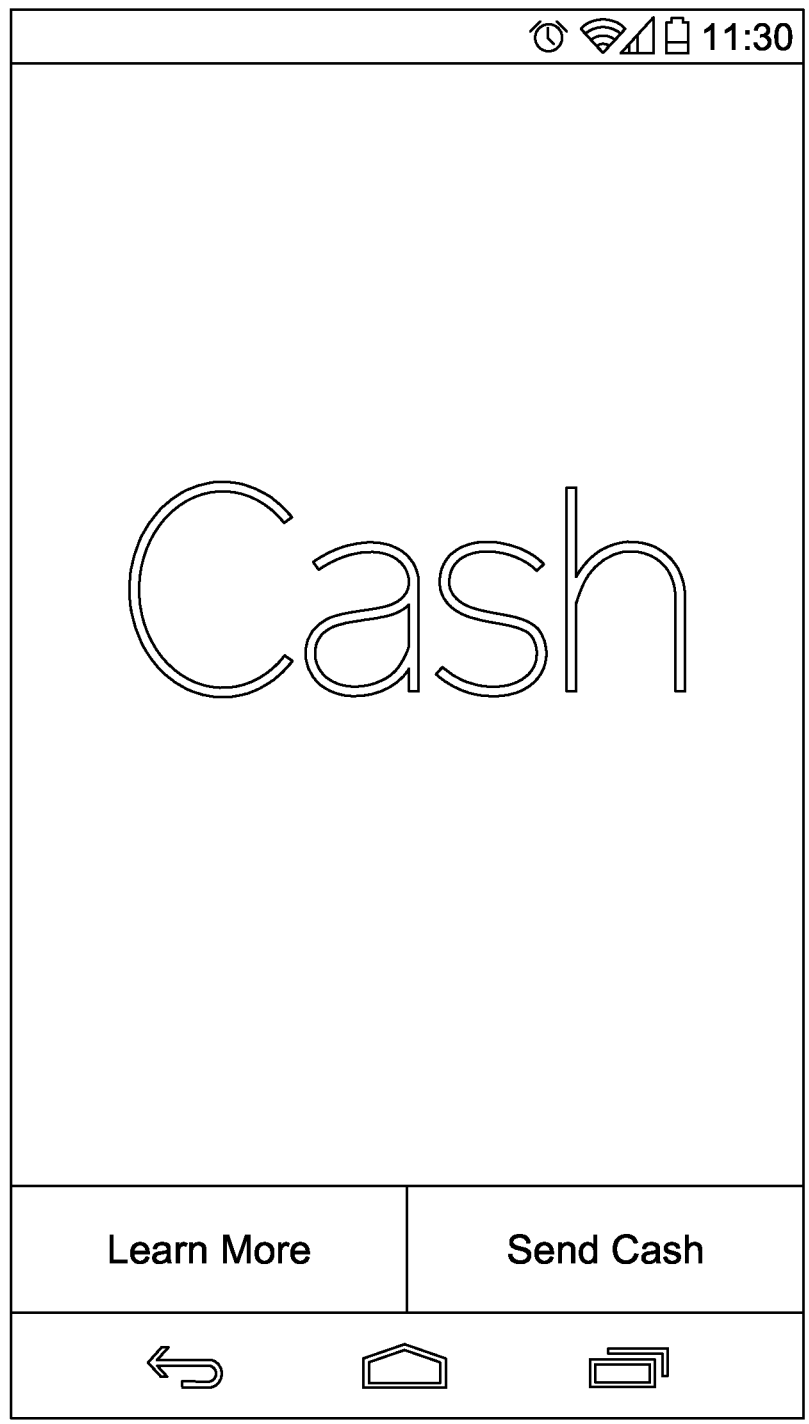
FIG. 7A-7K illustrate various examples of graphical user interface screens that can be used in accordance with one or more embodiments of the disclosed technology.
Figure 7B:
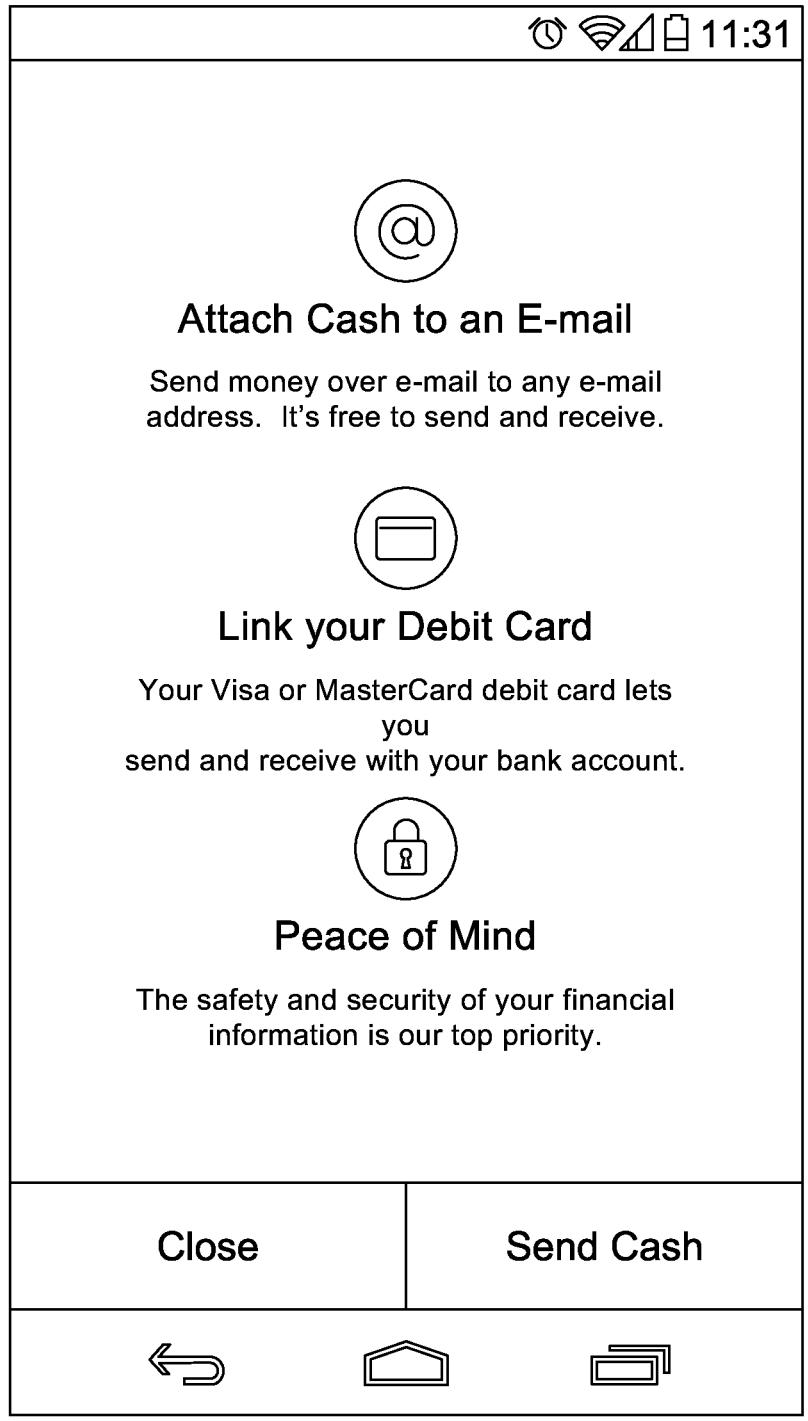
Figure 7C:
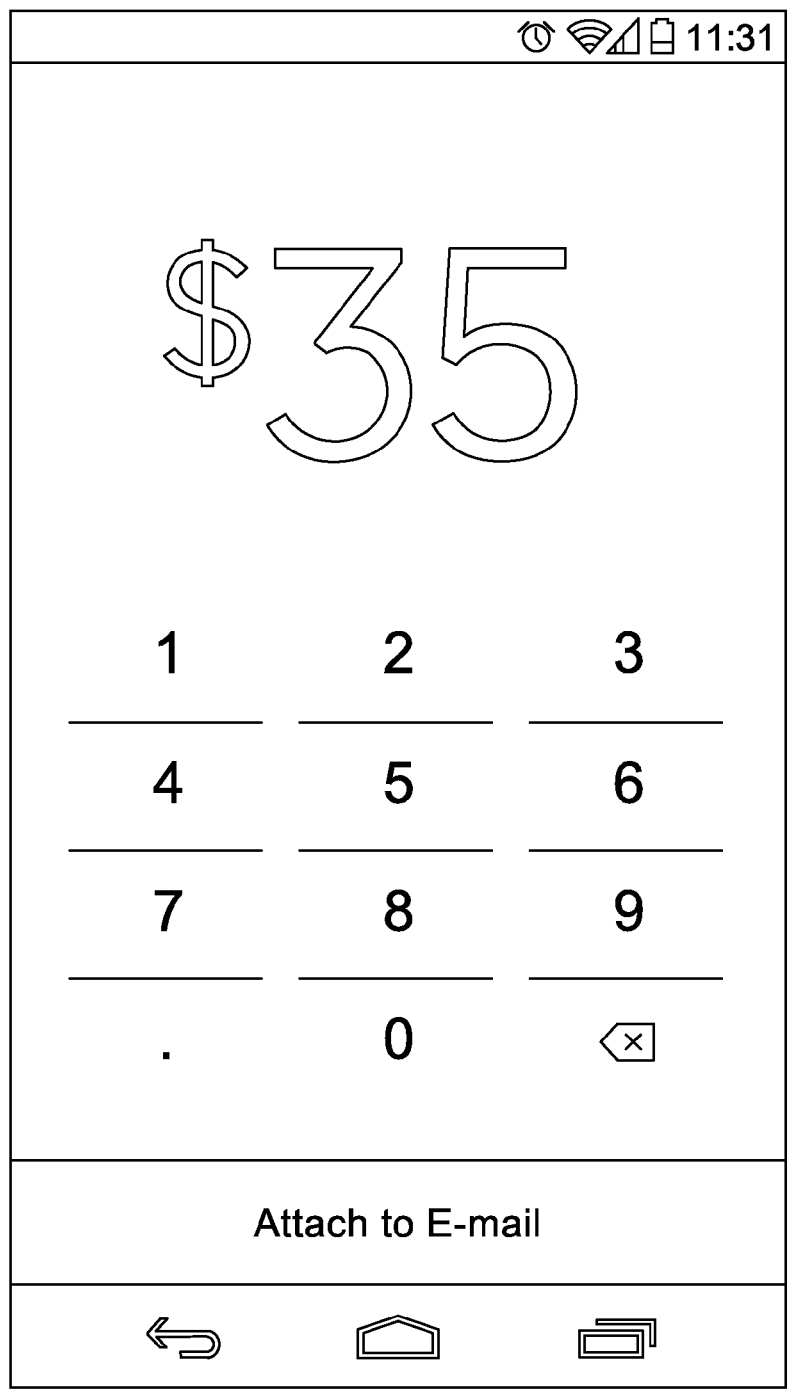
Figure 7D:
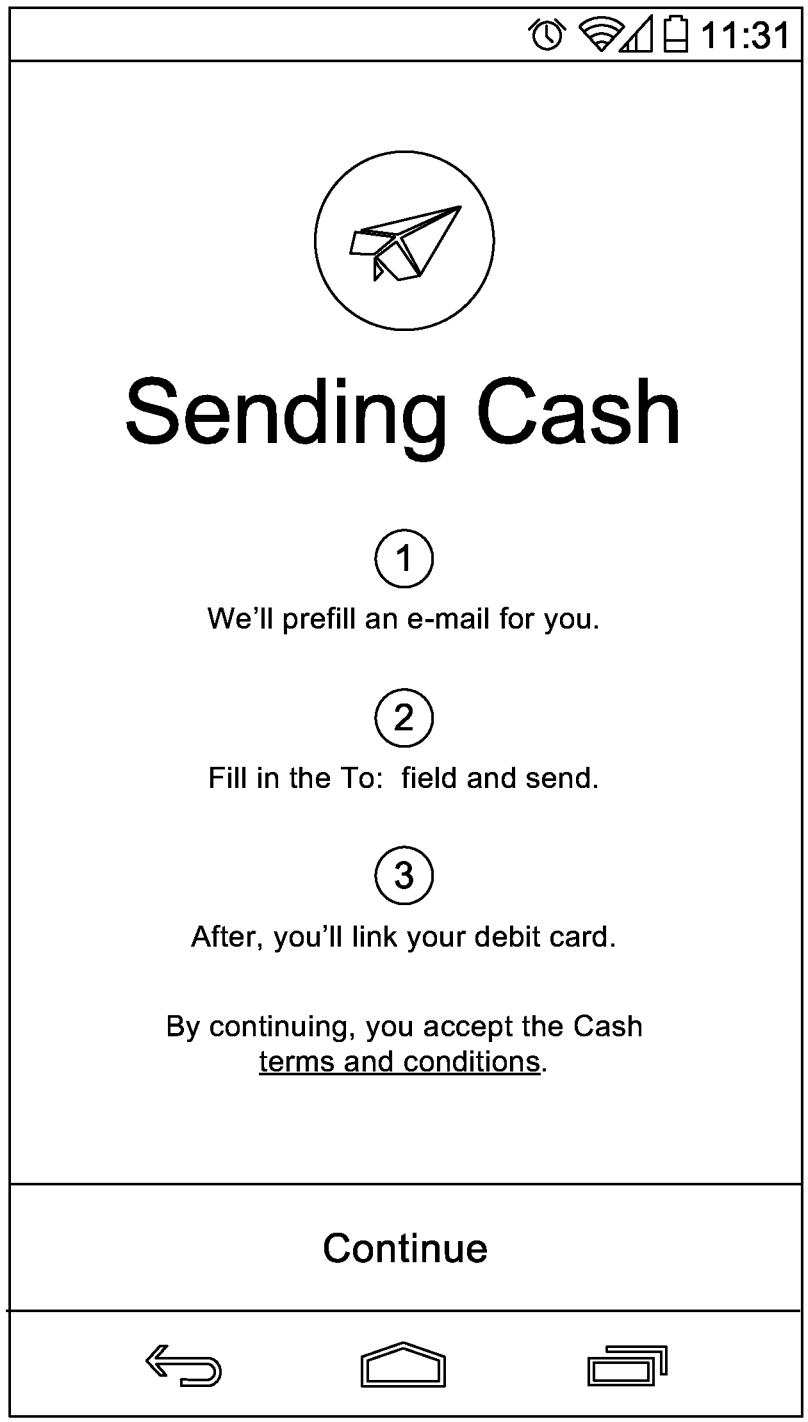
Figure 7E:
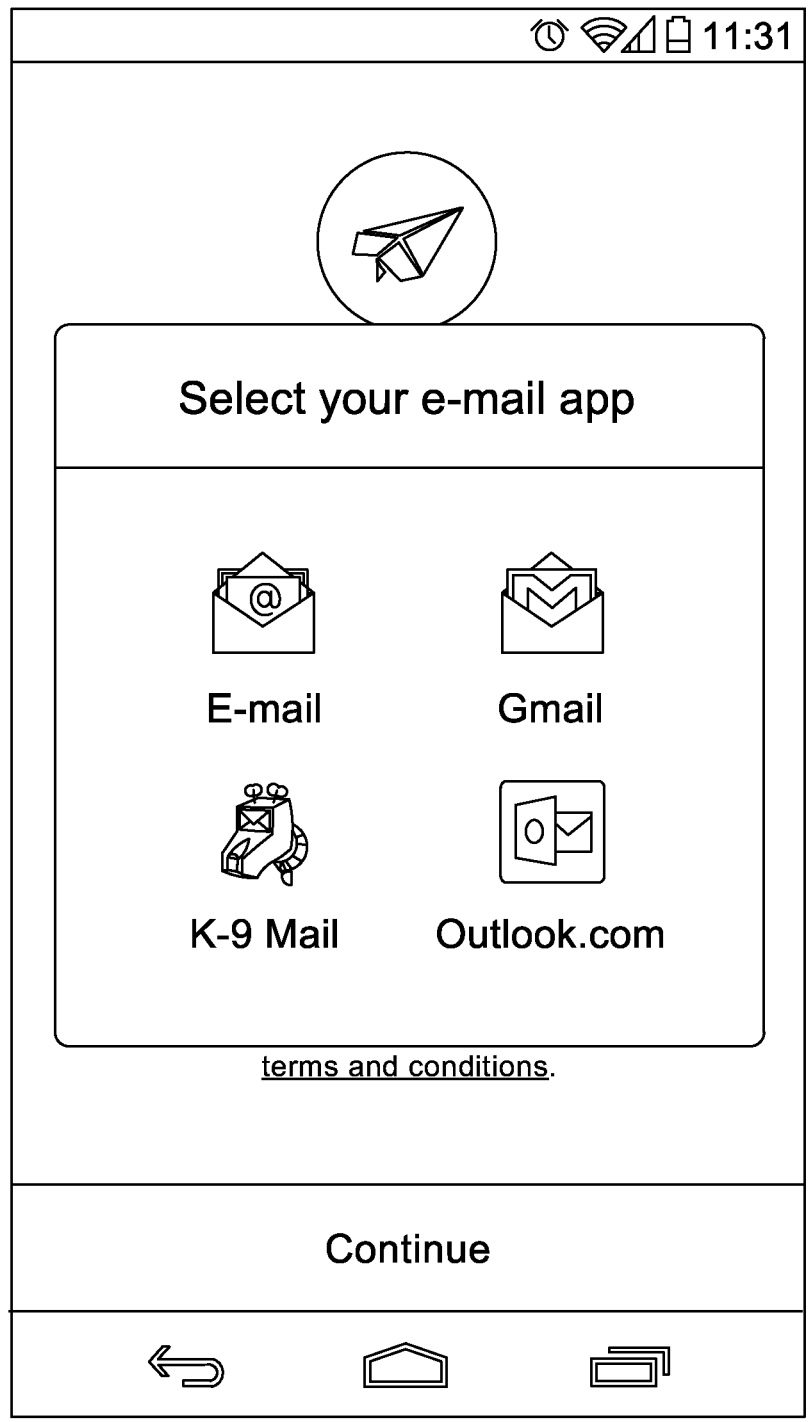
Figure 7F:
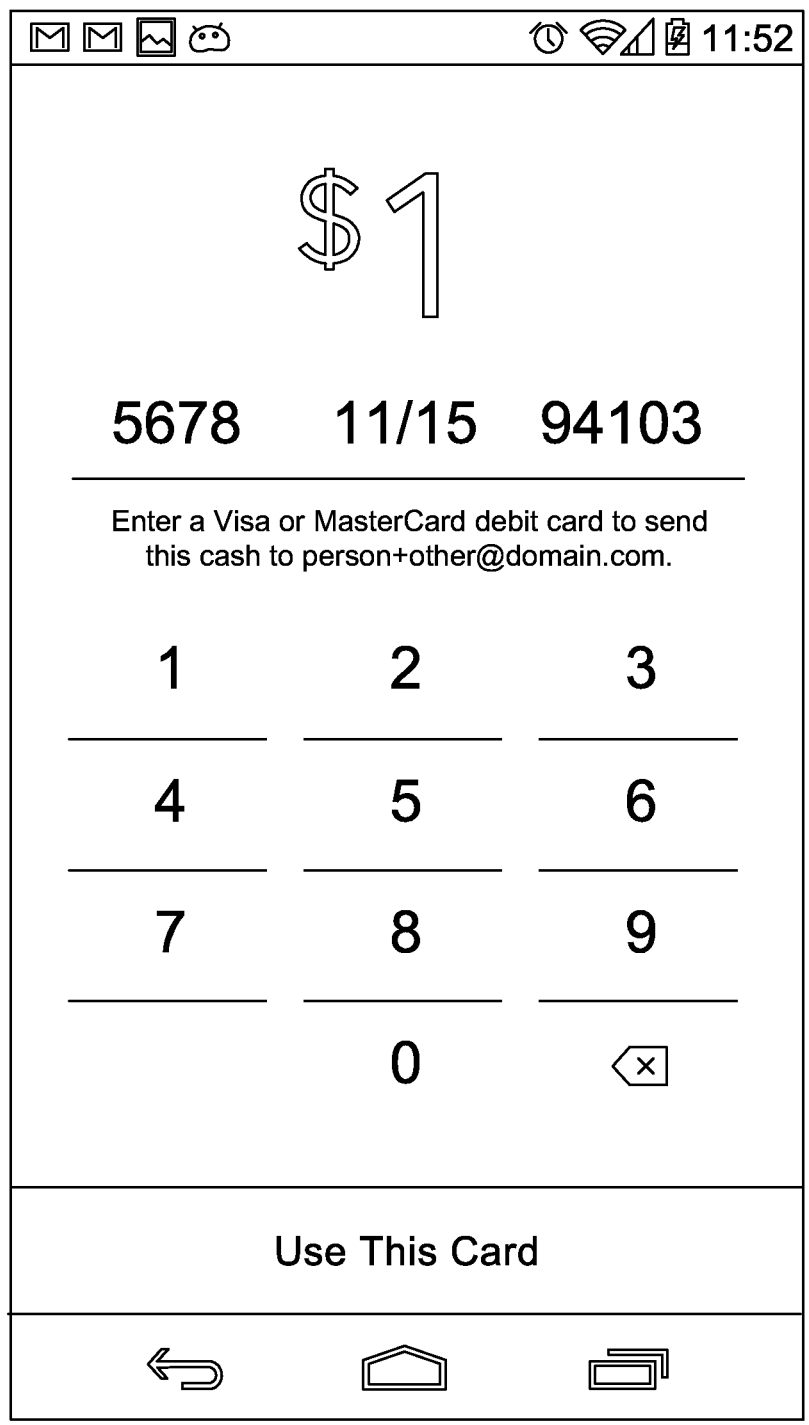
Figure 7G:
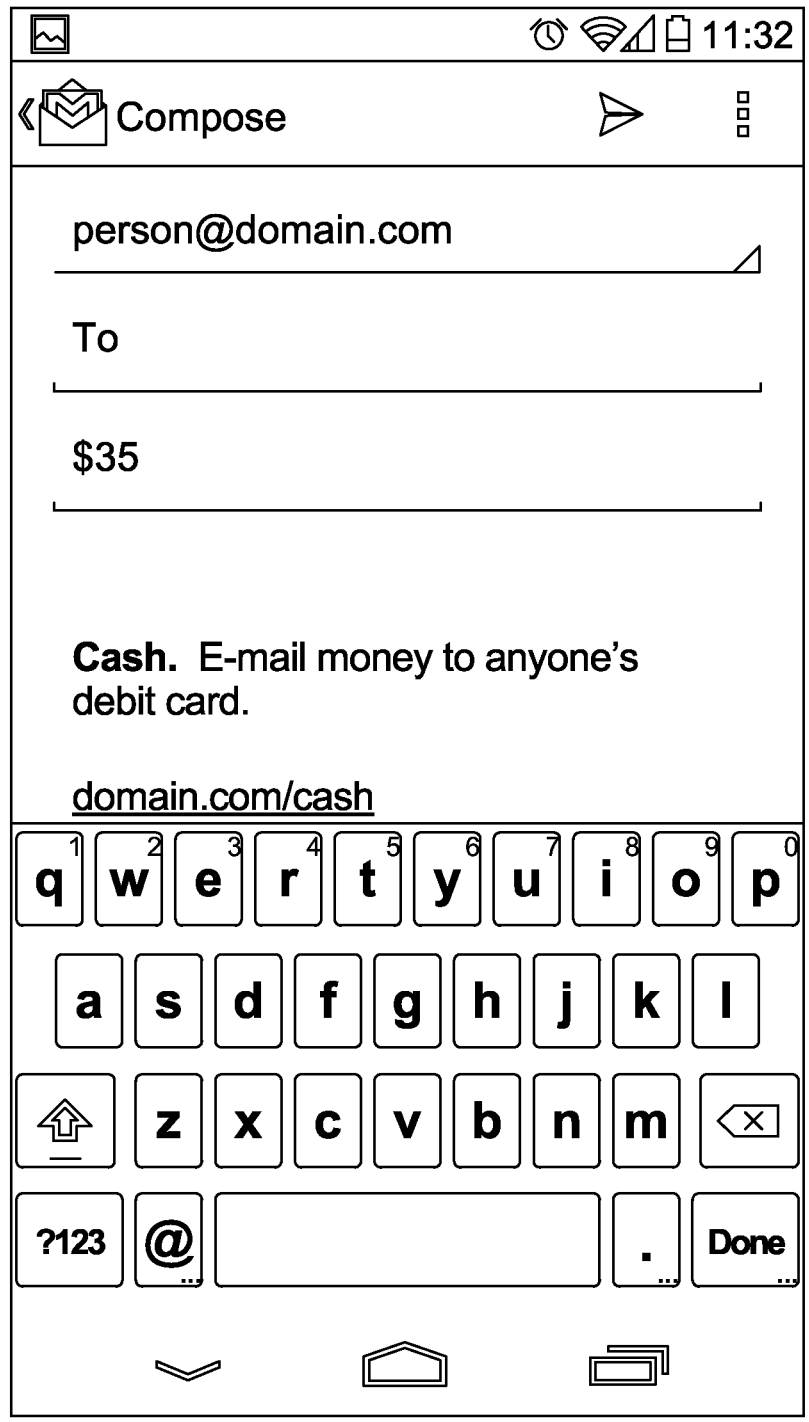
Figure 7H:
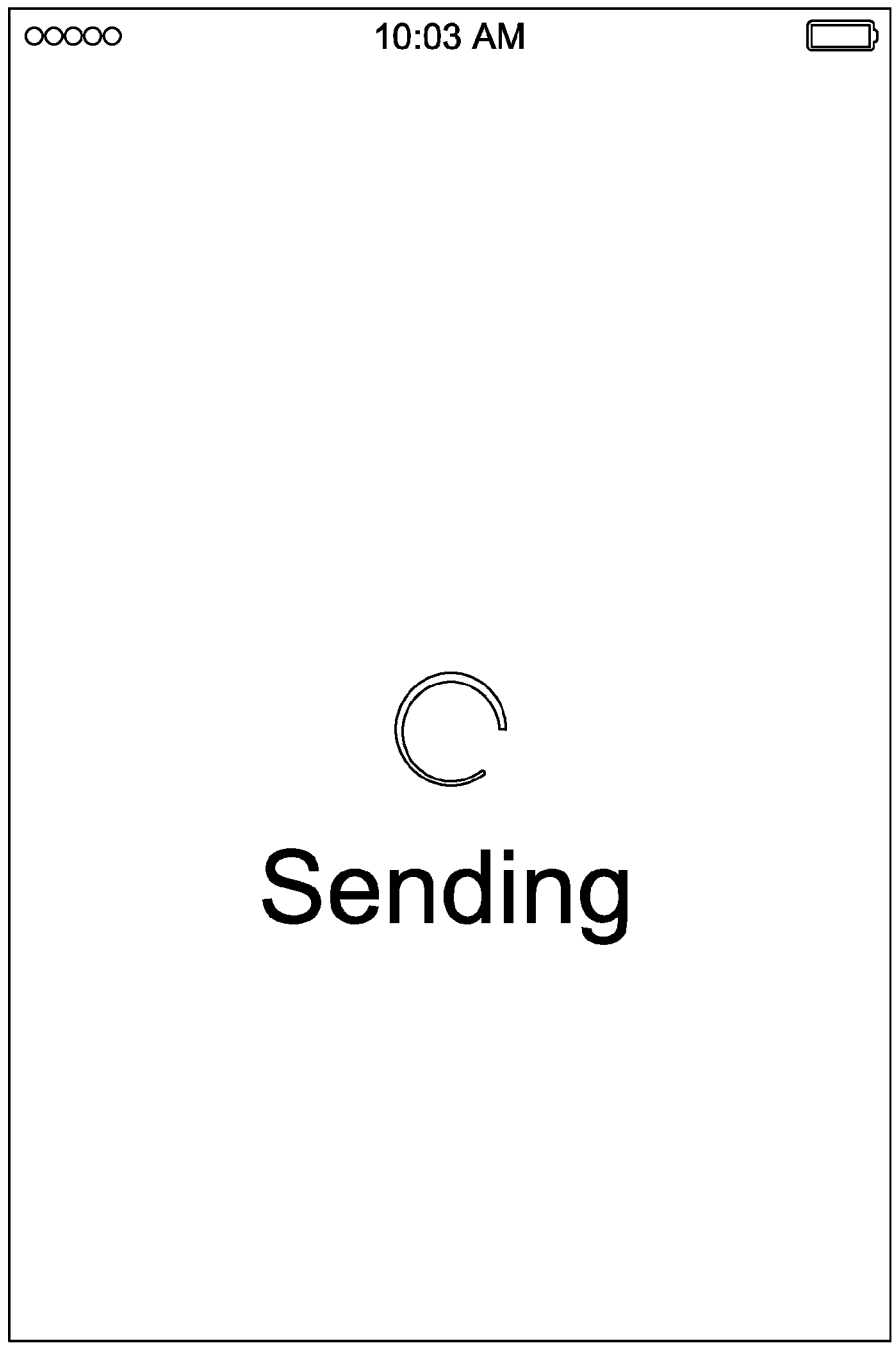

FIG. 7A is an example of a startup screen of the payment facilitation application. FIG. 7B is an example of a "learn more" page linked from the start up screen. FIG. 7C is an example of a payment amount entry interface of the payment facilitation application. FIG. 7D is an example process flow of sending a payment through e-mail. FIG. 7E is an example of an e-mail application selection screen from the payment facilitation application. FIG. 7F is an example of an interface to associate a financial account/payment card with an e-mail account, such as the interface used to associate the financial account of the sender user or the interface used to associate the financial account of the recipient user. FIG. 7G is an example of operation 510, where the sender user is customizing the payment e-mail on an e-mail application of the electronic device. FIG. 7H is an example of sending a payment e-mail from the electronic device of the sender user.

Figure 7I:
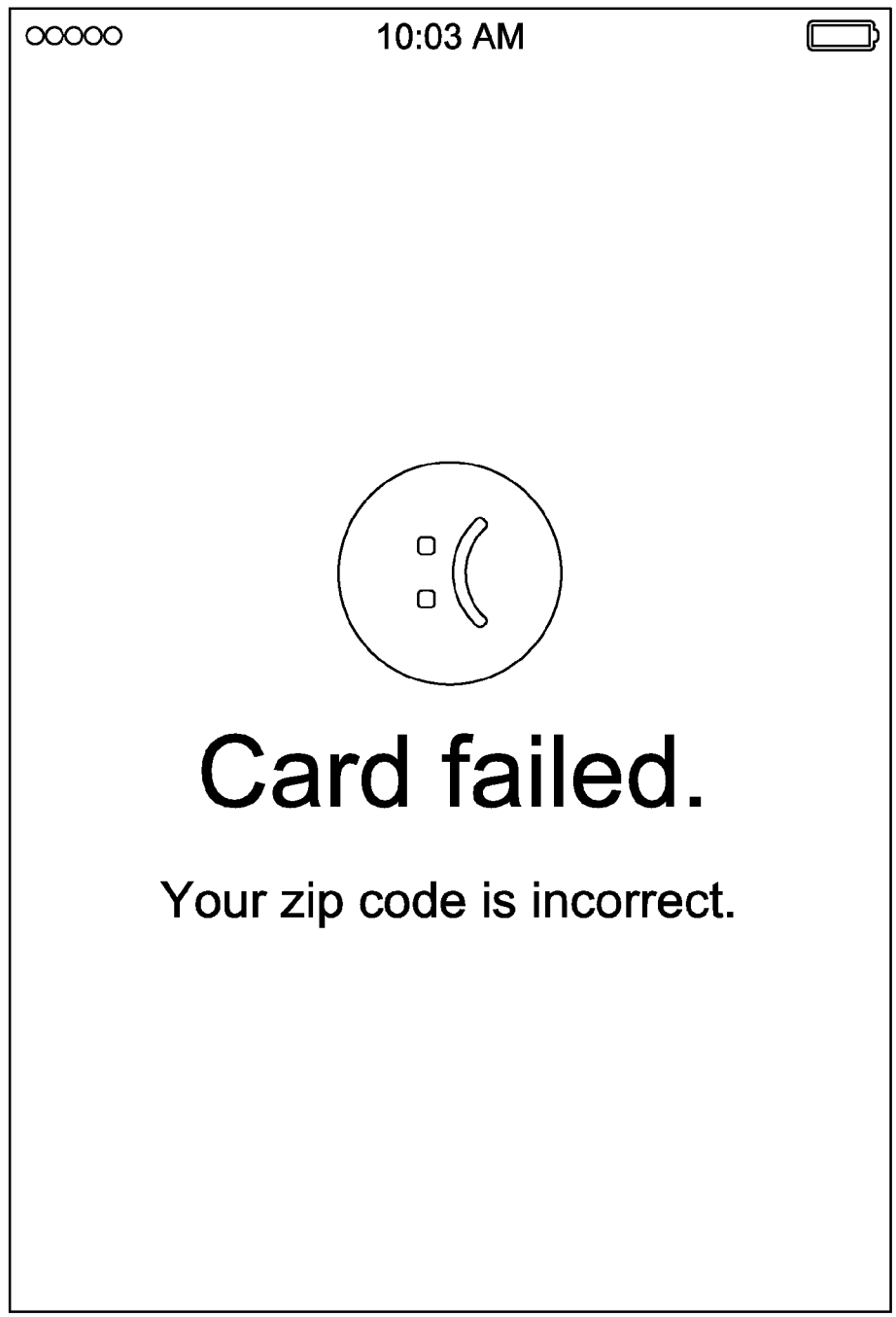
Figure 7J:
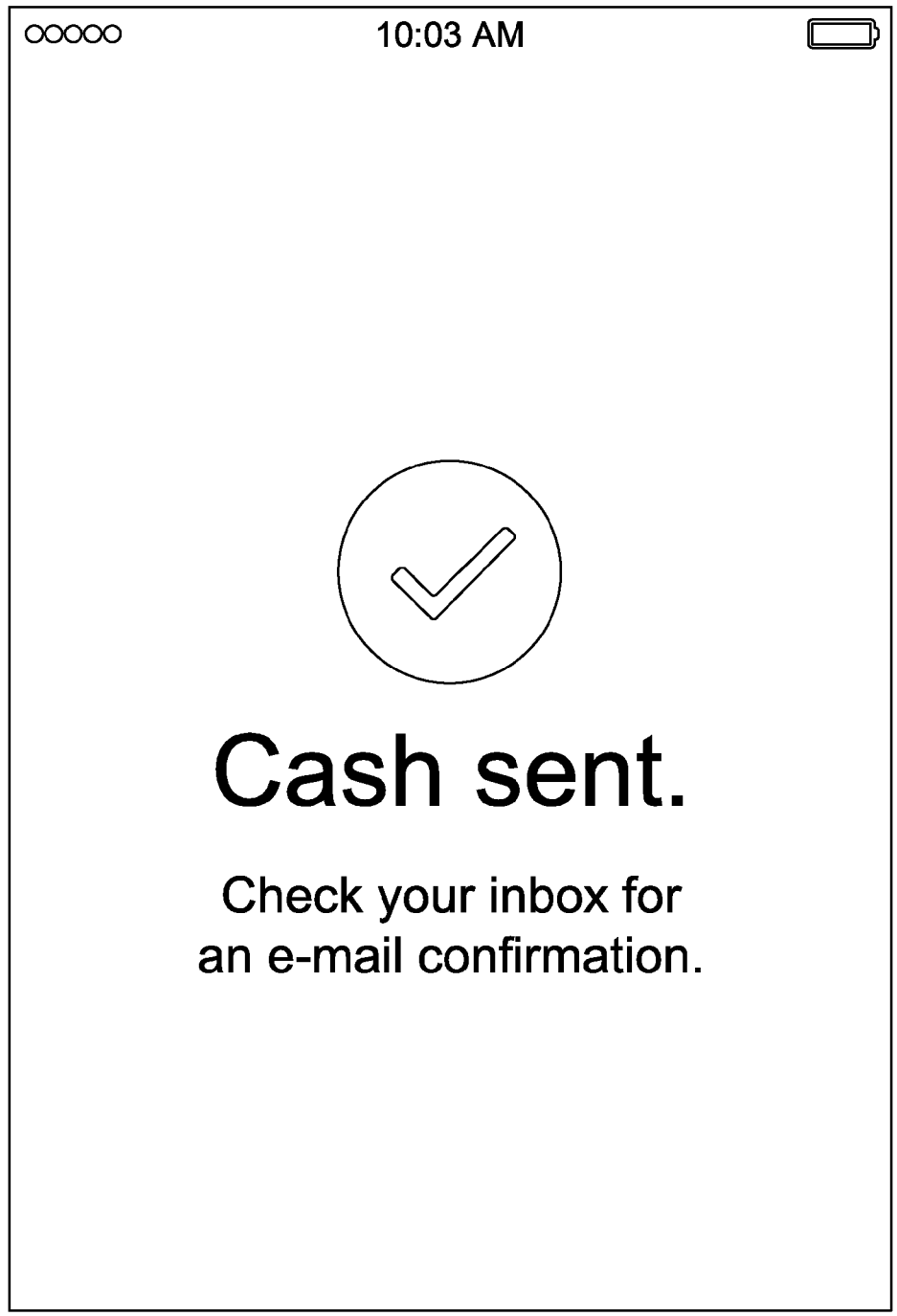
Figure 7K:

FIG. 7I is an example of a screen indicating that the financial account information indicated by the sender user or the recipient user has been rejected by the payment processing system. FIG. 7J is an example of a confirmation screen after the payment e-mail is sent. FIG. 7K is an example of an interface to enter financial account information on the payment facilitation application or on an interface in a financial account request e-mail.

Exemplary Computer System Overview

Aspects and implementations of an authentication system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 8:
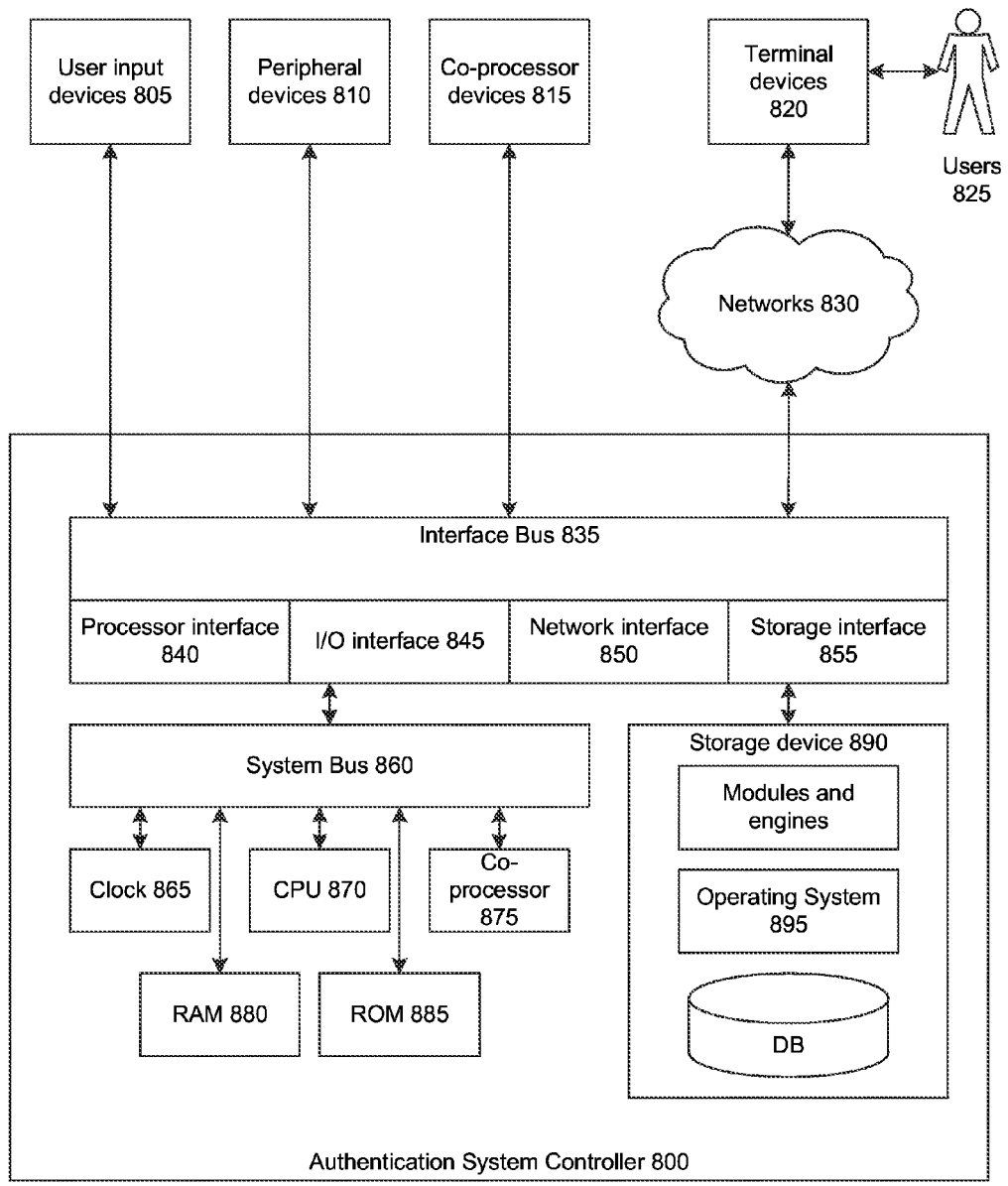
FIG. 8 illustrates an example of a computer system with which some embodiments of the disclosed technology may be utilized.

FIG. 8 is a block diagram illustrating an example machine representing the computer systemization of the authentication system. The authentication system controller 800 may be in communication with entities including one or more users 825, client/terminal devices 820 (e.g., devices 110), user input devices 805, peripheral devices 810, an optional co-processor device(s) (e.g., cryptographic processor devices) 815, and networks 830 (e.g., 115). Users may engage with the controller 800 via terminal devices 820 over networks 830.

Computers may employ central processing unit (CPU) or processor (hereinafter "processor") to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The controller 800 may include clock 865, CPU 870, memory such as read only memory (ROM) 885 and random access memory (RAM) 880 and co-processor 875 among others. These controller components may be connected to a system bus 860, and through the system bus 860 to an interface bus 835. Further, user input devices 805, peripheral devices 810, co-processor devices 815, and the like, may be connected through the interface bus 835 to the system bus 860. The interface bus 835 may be connected to a number of interface adapters such as processor interface 840, input output interfaces (I/O) 845, network interfaces 850, storage interfaces 855, and the like.

Processor interface 840 may facilitate communication between co-processor devices 815 and co-processor 875. In one implementation, processor interface 840 may expedite encryption and decryption of requests or data. Input output interfaces (I/O) 845 facilitate communication between user input devices 805, peripheral devices 810, co-processor devices 815, and/or the like and components of the controller 800 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 850 may be in communication with the network 830. Through the network 830, the controller 800 may be accessible to remote terminal devices 820 (e.g., client devices 110). Network interfaces 850 may use various wired and wireless connection protocols such as, direct connect, Ethernet, wireless connection such as IEEE 802.11a-x, and the like.

Examples of network 830 include the Internet, Local Area Network (LAN), Metropolitan Area Network (MAN), a Wide Area Network (WAN), wireless network (e.g., using Wireless Application Protocol (WAP), a secured custom connection, and the like. The network interfaces 850 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 855 may be in communication with a number of storage devices such as, storage devices 890, removable disc devices, and the like. The storage interfaces 855 may use various connection protocols such as Serial Advanced Technology Attachment (SATA), IEEE 1394, Ethernet, Universal Serial Bus (USB), and the like.

User input devices 805 and peripheral devices 810 may be connected to I/O interface 845 and potentially other interfaces, buses and/or components. User input devices 805 may include card readers, finger print readers, joysticks, keyboards, microphones, mouse, remote controls, retina readers, touch screens, sensors, and/or the like. Peripheral devices 810 may include antenna, audio devices (e.g., microphone, speakers, etc.), cameras, external processors, communication devices, radio frequency identifiers (RFIDs), scanners, printers, storage devices, transceivers, and/or the like. Co-processor devices 815 may be connected to the controller 800 through interface bus 835, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 800 may employ various forms of memory including on-chip CPU memory (e.g., registers), RAM 880, ROM 885, and storage devices 890. Storage devices 890 may employ any number of tangible, non-transitory storage devices or systems such as fixed or removable magnetic disk drive, an optical drive, solid state memory devices and other processor-readable storage media. Computer-executable instructions stored in the memory may have one or more program modules such as routines, programs, objects, components, data structures, and so on that perform particular tasks or implement particular abstract data types. For example, the memory may contain operating system (OS) component 895, modules and other components, database tables, and the like. These modules/components may be stored and accessed from the storage devices, including from external storage devices accessible through an interface bus.

The database components can store programs executed by the processor to process the stored data. The database components may be implemented in the form of a database that is relational, scalable and secure. Examples of such a database include DB2, MySQL, Oracle, Sybase, and the like. Alternatively, the database may be implemented using various standard data-structures, such as an array, hash, list, struct, structured text file (e.g., XML), table, and/or the like. Such data-structures may be stored in memory and/or in structured files.

The controller 800 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the controller 800 may be distributed electronically over the Internet or over other networks (including wireless networks). Those skilled in the relevant art will recognize that portions of the authentication system may reside on a server computer, while corresponding portions reside on a client computer. Data structures and transmission of data particular to aspects of the controller 800 are also encompassed within the scope of the invention.

The above Detailed Description of embodiments of the disclosure is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative combinations or sub-combinations. Each of these processes or blocks may be implemented in a variety of different ways. Also, while processes or blocks are at times shown as being performed in series, these processes or blocks may instead be performed or implemented in parallel, or may be performed at different times.

In conclusion, the disclosed technology provides novel systems, methods and arrangements for account creation and login by sending e-mails. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features.

What is claimed is:

1. A computer-implemented method for initiating a money transfer from a sender to a recipient, comprising:
receiving, by a payment application executing on a mobile device of the sender, a request to initiate the money transfer provided by a payment processing system, the request to initiate the money transfer including a payment amount and payment account information associated with the sender, the payment amount and the payment account information being entered by the sender into the payment application, wherein the payment application is associated with the payment processing system and is configured to communicate with a native email application executing on the mobile device of the sender to generate and send emails to the payment processing system for initiating money transfers, wherein the payment application is configured to enable the sender to submit the request to initiate the money transfer without registration with the payment processing system or login with the payment application;

in response to the request to initiate the money transfer:

launching, by the payment application, the native email application executing on the mobile device;

upon launching the native email application, causing, by the payment application, the native email application executing on the mobile device to generate an email to be transmitted from the mobile device to the payment processing system, and further to prepopulate the email with information including device identification information associated with the mobile device, the payment account information associated with the sender, the payment amount, a sender email address of the sender, and a payment processing email address of the payment processing system, wherein the email includes a field to receive, from the sender, a recipient email address of the recipient;

based on a receipt, via the native email application, of the recipient email address and an indication to send the email from the sender, receiving, by the payment processing system, the email sent from the mobile device; and in response to receiving the email from the mobile device:

analyzing the email, by the payment processing system, to verify an authenticity of the email based, at least in part, on the device identification information included in the email;

based on the verification, analyzing, by the payment processing system, the email to identify the payment amount included in the email and a payment account based on the payment account information included in the email; and linking, by the payment processing system, the sender email address with the payment account; and generating, by the payment processing system, a transaction account with the payment processing system for the sender based on the email received from the mobile device, said generating the transaction account including linking the transaction account with the payment account to initiate the money transfer requested in the email.

2. The method of claim 1, further comprising:

transmitting, by the payment processing system, a financial account request to the recipient email address to prompt for recipient payment account information;

upon receiving the recipient payment account information, determining, by the payment processing system, a recipient payment account based on the recipient payment account information; and transferring, by the payment processing system, the payment amount from the payment account of the sender to the recipient payment account.

3. The method of claim 1, wherein the device identification information and the payment account information are embedded in the email, such that only the payment processing system is able to analyze.

4. A computer-implemented method comprising:

receiving, by a service processing system, via a wired or wireless data communications network, from a mobile device of a user, a service e-mail that incorporates a request for initiation of a service provided by the service processing system, the service email including an email address of the user and a service processing email address of the service processing system, the service email being transmitted to the service processing system using a native email application installed on the mobile device, wherein the native email application is caused, by a service application executing on the mobile device, to generate the service email in response to a service request received from the user through the service application, wherein the native email application is further caused by the service application to pre-populate the service email with the email address of the user, the service processing email address of the service processing system, and device identification information associated with the mobile device, wherein the service processing system is configured to enable the user to submit the request for initiation of the service via email without registration with the service processing system or login with the service application;

in response to receiving the service e-mail that incorporates the request for initiation of the service:

analyzing the email, by the service processing system, to verify an authenticity of the email based, at least in part, on the device identification information included in the email;

verifying, by the service processing system, whether a service account with the service processing system is associated with the email address, said verifying including accessing a database storing association data between user service accounts and user email addresses, and comparing the email address of the user with the user email addresses to identify a matching email address and an associated service account;

in response to a verification that the email address is not associated with the service account, generating, by the service processing system, the service account with the service processing system for the user, the generating including associating the service account with the email address based on the service email received from the mobile device; and initiating, by the service processing system, the service based on the service email received from the mobile device.

5. The computer-implemented method of claim 4, wherein the service is a transfer of money from the user to a recipient.

6. The computer-implemented method of claim 4, further comprising:

determining, by the service processing system, a financial account associated with the user based on the service email received from the mobile device; and associating, by the service processing system, the financial account with the email address.

7. The computer-implemented method of claim 4, further comprising:

transmitting, by the service processing system, via the wired or wireless data communications network, to the mobile device of the user, a linking invitation configured to prompt the user to input financial account information for a financial account to associate the financial account with the request for initiation of the service;

in response to receiving the financial account information from the mobile device of the user, storing, by the service processing system, the financial account information for the financial account; and associating the financial account with the email address included in the service email that incorporates the request for initiation of the service.

8. A computer-implemented method comprising:

receiving, by a payment application executing at a computing device of a user, a request to initiate a financial service provided by a financial processing system; and in response to the request to initiate the financial service, launching, by the payment application, a native communication application executing on the computing device;

upon launching the native communication application, causing, by the payment application, the communication application installed on the computing device to generate a communication message to be transmitted via a wired or wireless data communications network to the financial processing system to initiate the financial service, and further to prepopulate the communication message with a financial processing email address of the financial processing system, wherein the communication message is configured to cause the financial processing system, upon a receipt of the communication message, to verify whether a service account with the financial processing system is associated with a sender address associated with the communication message, wherein to verify includes to access a database storing association data between user service accounts and user addresses, and comparing the sender address with the user addresses to identify a matching address and an associated service account, to generate, in response to a verification that the sender address is not associated with the service account, the service account with the financial processing system for the user, to identify a financial account associated with the user, and to associate the financial account with the service account.

9. The computer-implemented method of claim 8, wherein the communication message comprises identification information associated with the computing device and a communication address associated with the user; and wherein the computer-implemented method further comprises associating, by the payment application, the communication address and the identification information with the service account.

10. The computer-implemented method of claim 8, wherein the communication message comprises financial account information associated with the user, and wherein the financial account is identified based on the financial account information.

11. The computer-implemented method of claim 8, further comprising:

receiving, through the communication application installed on the computing device, a financial account request for the user to submit financial account information; and identifying the financial account based on the financial account information.

12. The computer-implemented method of claim 8, wherein the communication message is an email message or a text message.

13. A financial processing system comprising:

a processor;

a communications module; and a non-transitory computer-readable storage medium containing a set of instructions that, when executed on the processor, cause the financial processing system to:

receive, via the communications module via a wired or wireless data communications network, a transaction email from a computing device of a first user to request a financial transaction service to be executed by the financial processing system, wherein the transaction email is generated by an email application installed on the computing device of the first user, wherein the email application is launched by a service application, executing on the computing device of the first user, in response to a service request received from the first user through the service application, wherein the service application causes the email application, upon launching, to prepopulate the transaction email with a financial processing email address of the financial processing system, wherein the financial processing system is configured to execute the financial transaction service without requiring a registration with the financial processing system by the first user;

based on the transaction email received, determine and associate, by the processor and via the communications module, a financial account with an email address of the first user; and execute, by the processor, the financial transaction service using the financial account.

14. The financial processing system of claim 13, wherein the set of instructions that, when executed on the processor, cause the financial processing system to further:

send, via the communications module, a financial account request to the email address of the first user to prompt the first user to input financial account information, wherein the financial account is determined based on the financial account information.

15. The financial processing system of claim 13, wherein the set of instructions that, when executed on the processor, cause the financial processing system to store an association of the financial account with the email address of the first user, the association including financial account information associated with the financial account, such that future transaction e-mails identifying the user do not cause the financial processing system to send additional financial account requests to the user.

16. The financial processing system of claim 13, wherein the set of instructions that, when executed on the processor, cause the financial processing system to authenticate the email by determining if the e-mail address of the first user has been spoofed.

* * * * *